US012634961B2

(12) United States Patent
Liu et al.

(10) Patent No.: US 12,634,961 B2
(45) Date of Patent: May 19, 2026

(54) DYNAMIC CODING FOR WIRELESS SYSTEMS

(71) Applicant: QUALCOMM INCORPORATED, San Diego, CA (US)

(72) Inventors: Kangqi Liu, San Diego, CA (US); Changlong Xu, Beijing (CN); Liangming Wu, Beijing (CN); Jian Li, Shanghai (CN); Xipeng Zhu, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/916,948

(22) PCT Filed: Jul. 10, 2020

(86) PCT No.: PCT/CN2020/101362
§ 371 (c)(1),
(2) Date: Oct. 4, 2022

(87) PCT Pub. No.: WO2022/006860
PCT Pub. Date: Jan. 13, 2022

(65) Prior Publication Data
US 2023/0145149 A1 May 11, 2023

(51) Int. Cl.
*H04W 72/30* (2023.01)
*H04L 12/18* (2006.01)
(Continued)

(52) U.S. Cl.
CPC .......... *H04W 72/30* (2023.01); *H04L 12/189* (2013.01); *H04W 72/0446* (2013.01); *H04W 76/40* (2018.02); *H04L 2001/0093* (2013.01)

(58) Field of Classification Search
CPC . H04W 72/30; H04W 76/40; H04W 72/0446; H04W 72/0093; H04W 4/06;
(Continued)

(56) References Cited

U.S. PATENT DOCUMENTS 10,123,335 B2 11/2018 Yerramalli et al.
2012/0011413 A1* 1/2012 Liu ...................... H03M 13/25
714/746

(Continued)

FOREIGN PATENT DOCUMENTS

CN 109922533 A 6/2019
CN 110149701 A * 8/2019 ........... H04L 5/0048
(Continued)

OTHER PUBLICATIONS

"Du et al., An Uplink Information Transmission Method And Device, Aug. 20, 2019, CN 201810144560" (Year: 2018).*
(Continued)

*Primary Examiner* — Ian N Moore
*Assistant Examiner* — Latresa A McCallum
(74) *Attorney, Agent, or Firm* — Holland & Hart LLP

(57) ABSTRACT

Methods, systems, and devices for wireless communications are described. One method of dynamically mapping encoded packets may include a base station identifying a set of encoded packets from a set of source packets. The base station may map subsets of the encoded packets onto a first and a second set of resources using different coding rates. In some examples, the base station may schedule one or more resources from the second set of resources for receiving feedback from one or more user equipments (UEs). In some examples, the base station may identify a second set of encoded packets from a second set of source packets and may map the second set of encoded packets onto the second set of resources and a third set of resources. A UE may (Continued)

recover the first or second sets of source packets based on the encoded packets transmitted by the base station.

40 Claims, 16 Drawing Sheets

(51) Int. Cl.
*H04W 72/0446* (2023.01)
*H04W 76/40* (2018.01)
*H04L 1/00* (2006.01)

(58) Field of Classification Search
CPC ........... H04L 12/189; H04L 2001/0093; H04L 1/0009; H04L 5/0044; H04L 5/0055; H04L 1/0041; H04L 1/0057; H04L 25/00
USPC ......................................................... 370/329
See application file for complete search history.

(56) References Cited

U.S. PATENT DOCUMENTS

| | | | | |
|---|---|---|---|---|
| 2014/0040693 | A1* | 2/2014 | Kim | H03M 13/3761 |
| | | | | 714/746 |
| 2016/0205586 | A1 | 7/2016 | Kim et al. | |
| 2018/0123841 | A1* | 5/2018 | Wilhelmsson | H04L 27/3488 |
| 2018/0132207 | A1 | 5/2018 | Zhang et al. | |
| 2019/0045333 | A1* | 2/2019 | Serbetci | H04L 1/0011 |
| 2019/0053097 | A1 | 2/2019 | Rico Alvarino et al. | |
| 2019/0223184 | A1 | 7/2019 | Sarkis et al. | |
| 2019/0349952 | A1* | 11/2019 | Uchiyama | G08G 1/0965 |
| 2024/0089997 | A1* | 3/2024 | Takeda | H04L 1/1835 |

FOREIGN PATENT DOCUMENTS

| | | |
|---|---|---|
| CN | 110679095 A | 1/2020 |
| WO | WO-2017019258 | 2/2017 |

OTHER PUBLICATIONS

Bi et al., Broadcast/Multicast Services in Wireless Communications Networks and Methods, Jul. 21, 2005, WO 200565204 (Year: 2004).*

"Lu et al., A Method for Reliable Broadcast in the Wireless Local Area Network, Oct. 10, 2012, CN 10182-586" (Year: 2010).*

Guillouard et al., Method of Transmission of at Least a Data Packet by Several Antennas and Corresponding Reception Method, Jul. 1, 2009, EP 2075927 (Year: 2007).*

Du, Ying, English Translation for CN-110149701—An Uplink Information Transmission Method and Device, Aug. 20, 2019, CN-110149701-A, Entire document (Year: 2019).*

Supplementary European Search Report—EP20943901—Search Authority—Munich—Mar. 5, 2024.

CATT: "Remaining Details of UCI Multiplexing on PUSCH", 3GPP TSG RAN WG1 Meeting #92, R1-1801733, Athens, Greece, Feb. 26, 2018-Mar. 2, 2018, 5 Pages, Mar. 2, 2018 (Mar. 2, 2018) sections 1-3.

International Search Report and Written Opinion—PCT/CN2020/101362—ISA/EPO—Apr. 12, 2021.

* cited by examiner

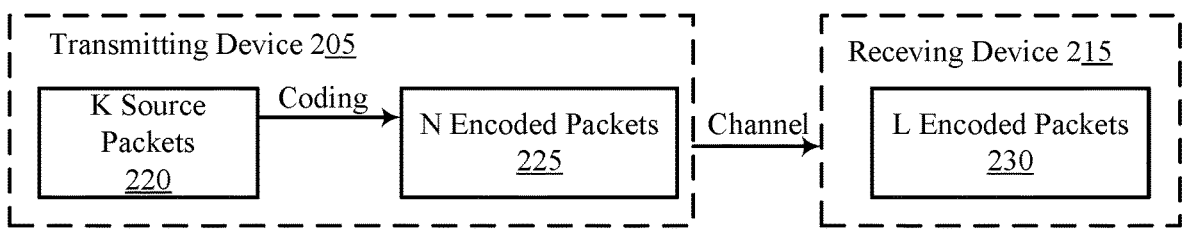
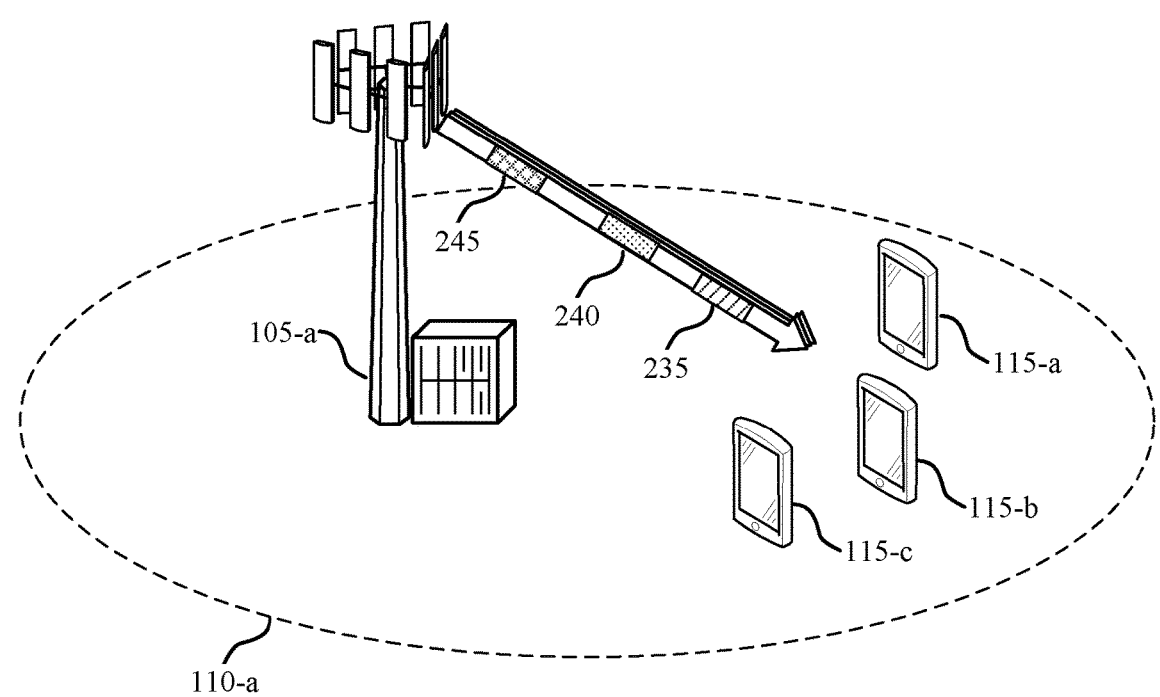
FIG. 2

FIG. 3

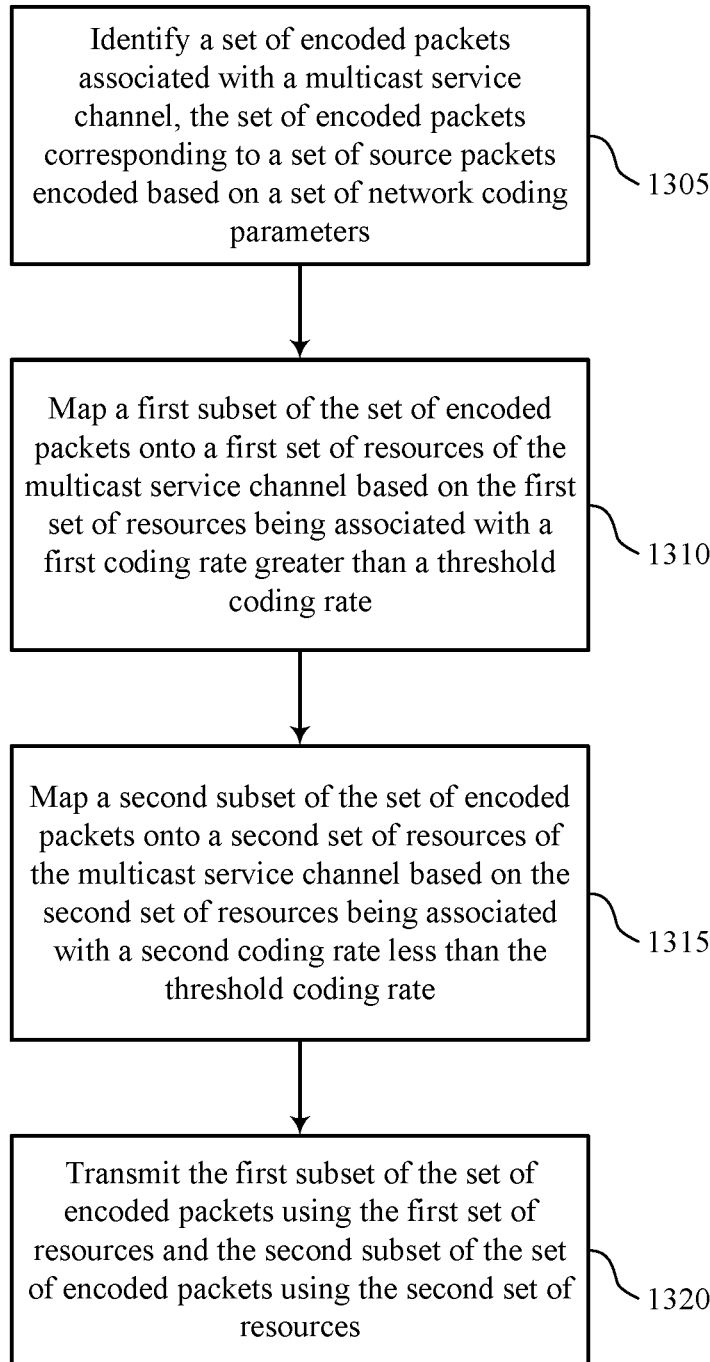

Identify a set of encoded packets associated with a multicast service channel, the set of encoded packets corresponding to a set of source packets encoded based on a set of network coding parameters

1305

Map a first subset of the set of encoded packets onto a first set of resources of the multicast service channel based on the first set of resources being associated with a first coding rate greater than a threshold coding rate

1310

Map a second subset of the set of encoded packets onto a second set of resources of the multicast service channel based on the second set of resources being associated with a second coding rate less than the threshold coding rate

1315

Transmit the first subset of the set of encoded packets using the first set of resources and the second subset of the set of encoded packets using the second set of resources

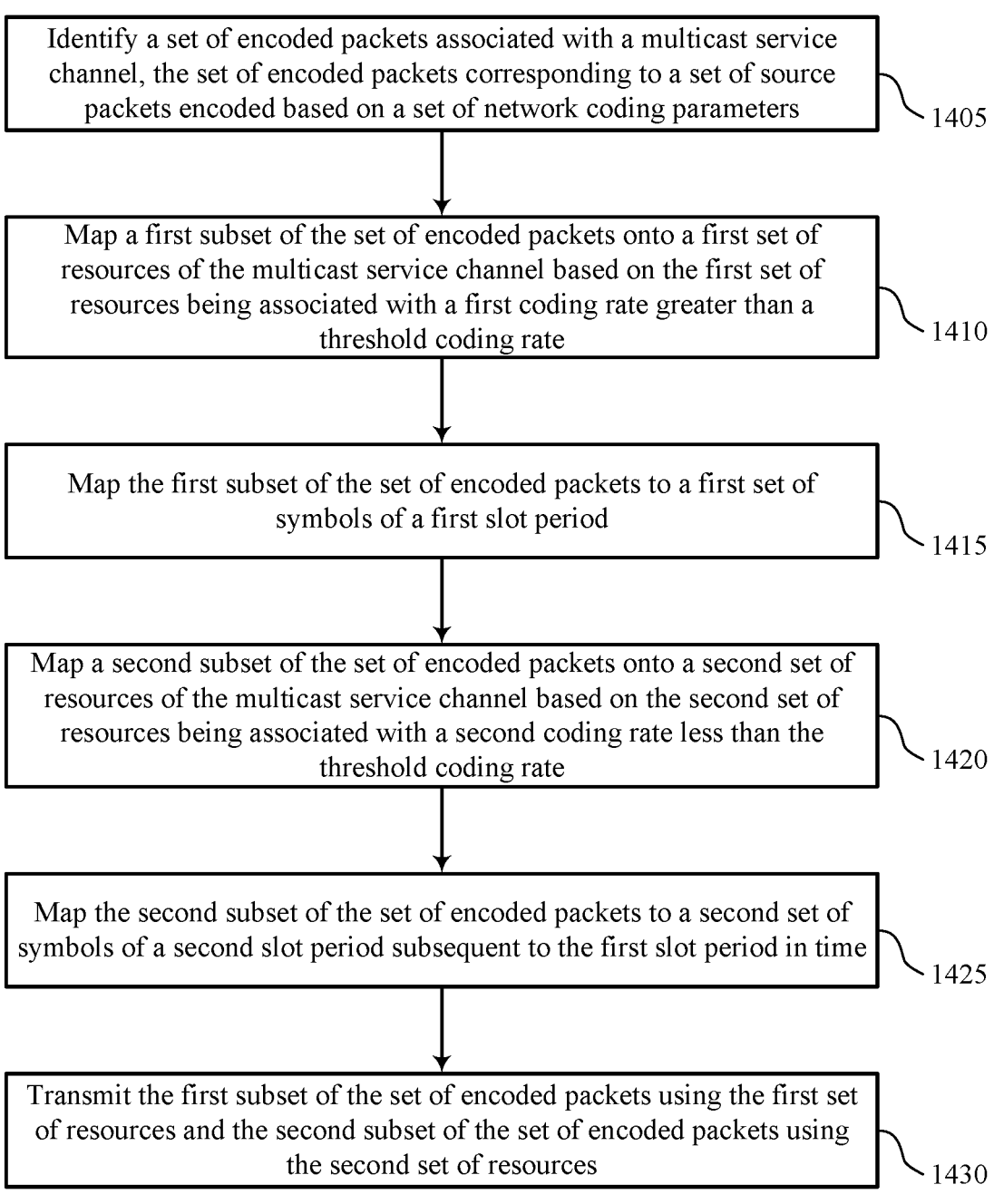

Identify a set of encoded packets associated with a multicast service channel, the set of encoded packets corresponding to a set of source packets encoded based on a set of network coding parameters

1405

Map a first subset of the set of encoded packets onto a first set of resources of the multicast service channel based on the first set of resources being associated with a first coding rate greater than a threshold coding rate

1410

Map the first subset of the set of encoded packets to a first set of symbols of a first slot period

1415

Map a second subset of the set of encoded packets onto a second set of resources of the multicast service channel based on the second set of resources being associated with a second coding rate less than the threshold coding rate

1420

Map the second subset of the set of encoded packets to a second set of symbols of a second slot period subsequent to the first slot period in time

1425

Transmit the first subset of the set of encoded packets using the first set of resources and the second subset of the set of encoded packets using the second set of resources

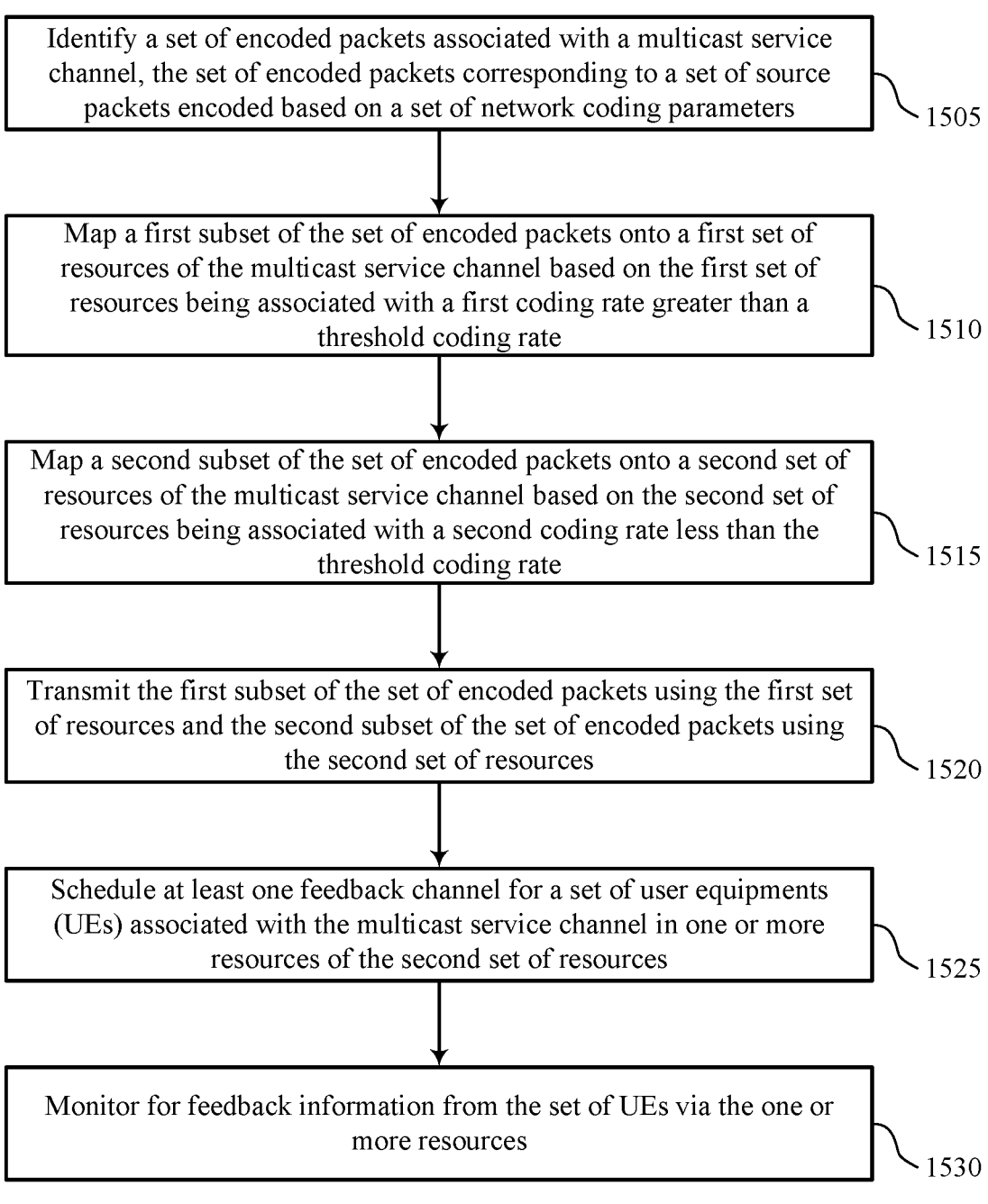

Identify a set of encoded packets associated with a multicast service channel, the set of encoded packets corresponding to a set of source packets encoded based on a set of network coding parameters

1505

Map a first subset of the set of encoded packets onto a first set of resources of the multicast service channel based on the first set of resources being associated with a first coding rate greater than a threshold coding rate

1510

Map a second subset of the set of encoded packets onto a second set of resources of the multicast service channel based on the second set of resources being associated with a second coding rate less than the threshold coding rate

1515

Transmit the first subset of the set of encoded packets using the first set of resources and the second subset of the set of encoded packets using the second set of resources

1520

Schedule at least one feedback channel for a set of user equipments (UEs) associated with the multicast service channel in one or more resources of the second set of resources

1525

Monitor for feedback information from the set of UEs via the one or more resources

DYNAMIC CODING FOR WIRELESS SYSTEMS

CROSS REFERENCE

The present Application is a 371 national stage filing of International PCT Application No. PCT/CN2020/101362 by LIU et al. entitled "DYNAMIC CODING FOR WIRELESS SYSTEMS," filed Jul. 10, 2020, which is assigned to the assignee hereof, and which is expressly incorporated by reference in its entirety herein.

FIELD OF TECHNOLOGY

The following relates generally to wireless communications and more specifically to dynamic coding for wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support broadcast services (e.g., a multicast broadcast service (MBS)) where a transmitting device (e.g., a network node, base station, etc.) broadcasts one or more encoded packets to one or more receiving devices (e.g., UEs). In some cases, the transmitting device may broadcast the encoded packets without receiving an indication that the encoded packets have been successfully or unsuccessfully decoded by the receiving devices. Accordingly, the transmitting device may broadcast a full set of encoded packets regardless of how many packets a receiving device successfully decodes, which may lead to an inefficient use of network resources.

SUMMARY

The described techniques relate to improved methods, systems, devices, and apparatuses that support dynamic coding for wireless systems. Generally, the described techniques provide for dynamically mapping encoded packets onto resources associated with a broadcast or multicast channel associated with a given service (e.g., multicast broadcast service (MBS)). Some examples may include a base station identifying encoded packets or encoding a set of source packets and mapping a first subset of the encoded packets onto a first set of resources and a second subset of encoded packets onto a second set of resources. In some examples, the base station may map the first and second subset of encoded packets using different coding rates, which may be associated with different channel conditions. In some examples, the base station may schedule one or more resources from the second set of resources for receiving feedback from one or more user equipments (UEs) subscribed to the service. In some examples, the base station may identify a second set of encoded packets from a second set of source packets. The base station may map a first subset of the second set of encoded packets onto one or more resources from the second set of resources and may map a second subset of the second set of encoded packets onto a third set of resources. Dynamically mapping encoded packets onto resources may allow a wireless communications system to improve reliability of communications services.

A method of wireless communications at a base station is described. The method may include identifying a set of encoded packets associated with a multicast service channel, the set of encoded packets corresponding to a set of source packets encoded based on a set of network coding parameters, mapping a first subset of the set of encoded packets onto a first set of resources of the multicast service channel based on the first set of resources being associated with a first coding rate greater than a threshold coding rate, mapping a second subset of the set of encoded packets onto a second set of resources of the multicast service channel based on the second set of resources being associated with a second coding rate less than the threshold coding rate, and transmitting the first subset of the set of encoded packets using the first set of resources and the second subset of the set of encoded packets using the second set of resources.

An apparatus for wireless communications at a base station is described. The apparatus may include a processor, memory coupled with the processor, and instructions stored in the memory. The instructions may be executable by the processor to cause the apparatus to identify a set of encoded packets associated with a multicast service channel, the set of encoded packets corresponding to a set of source packets encoded based on a set of network coding parameters, map a first subset of the set of encoded packets onto a first set of resources of the multicast service channel based on the first set of resources being associated with a first coding rate greater than a threshold coding rate, map a second subset of the set of encoded packets onto a second set of resources of the multicast service channel based on the second set of resources being associated with a second coding rate less than the threshold coding rate, and transmit the first subset of the set of encoded packets using the first set of resources and the second subset of the set of encoded packets using the second set of resources.

Another apparatus for wireless communications at a base station is described. The apparatus may include means for identifying a set of encoded packets associated with a multicast service channel, the set of encoded packets corresponding to a set of source packets encoded based on a set of network coding parameters, mapping a first subset of the set of encoded packets onto a first set of resources of the multicast service channel based on the first set of resources being associated with a first coding rate greater than a threshold coding rate, mapping a second subset of the set of encoded packets onto a second set of resources of the multicast service channel based on the second set of resources being associated with a second coding rate less than the threshold coding rate, and transmitting the first subset of the set of encoded packets using the first set of resources and the second subset of the set of encoded packets using the second set of resources.

A non-transitory computer-readable medium storing code for wireless communications at a base station is described. The code may include instructions executable by a processor to identify a set of encoded packets associated with a multicast service channel, the set of encoded packets corresponding to a set of source packets encoded based on a set of network coding parameters, map a first subset of the set of encoded packets onto a first set of resources of the multicast service channel based on the first set of resources being associated with a first coding rate greater than a threshold coding rate, map a second subset of the set of encoded packets onto a second set of resources of the multicast service channel based on the second set of resources being associated with a second coding rate less than the threshold coding rate, and transmit the first subset of the set of encoded packets using the first set of resources and the second subset of the set of encoded packets using the second set of resources.

Some examples of the method, apparatuses, and non-transitory computer-readable medium described herein may further include operations, features, means, or instructions for mapping the first subset of the set of encoded packets to a first set of symbols of a first slot period, and mapping the second subset of the set of encoded packets to a second set of symbols of a second slot period subsequent to the first slot period in time.

Some examples of the method, apparatuses, and non-transitory computer-readable medium described herein may further include operations, features, means, or instructions for determining a threshold number of encoded packets, where the first subset of the set of encoded packets corresponds to a first number of encoded packets below the threshold number of encoded packets and the second subset of the set of encoded packets corresponds to a second number of encoded packets above the threshold number of encoded packets.

Some examples of the method, apparatuses, and non-transitory computer-readable medium described herein may further include operations, features, means, or instructions for determining a channel quality of the multicast service channel, the channel quality corresponding to at least one UE supported by the base station, and determining the threshold number of encoded packets based on the channel quality.

Some examples of the method, apparatuses, and non-transitory computer-readable medium described herein may further include operations, features, means, or instructions for determining a number of UEs capable of decoding the set of encoded packets based on the channel quality, where the threshold number of encoded packets may be determined based on the number of UEs capable of decoding the set of encoded packets.

In some examples of the method, apparatuses, and non-transitory computer-readable medium described herein, the threshold number of encoded packets may be determined based on a capability of a threshold percentage of a set of user equipments (UEs) associated with the multicast service channel to recover the set of source packets from the transmitted first and second subsets.

Some examples of the method, apparatuses, and non-transitory computer-readable medium described herein may further include operations, features, means, or instructions for scheduling at least one feedback channel for a set of user equipments (UEs) associated with the multicast service channel in one or more resources of the second set of resources, and monitoring for feedback information from the set of UEs via the one or more resources.

In some examples of the method, apparatuses, and non-transitory computer-readable medium described herein, monitoring for the feedback information may include operations, features, means, or instructions for receiving, from at least one UE of the set of UEs, a negative acknowledgement message associated with the first subset of the set of encoded packets.

Some examples of the method, apparatuses, and non-transitory computer-readable medium described herein may further include operations, features, means, or instructions for transmitting, to the at least one UE of the set of UEs, the second subset of the set of encoded packets based on the negative acknowledgement message.

Some examples of the method, apparatuses, and non-transitory computer-readable medium described herein may further include operations, features, means, or instructions for determining an absence of feedback information from any UE of the set of UEs the set of UEs based on the monitoring, and transmitting, to the set of UEs, a second set of encoded packets corresponding to a second set of source packets based on determining the absence of feedback information.

In some examples of the method, apparatuses, and non-transitory computer-readable medium described herein, monitoring for the feedback information may include operations, features, means, or instructions for receiving, from at least one UE of the set of UEs, an indication of a difference between a number of encoded packets for decoding the set of source packets and a number of the first subset of the set of encoded packets received by the at least one UE.

Some examples of the method, apparatuses, and non-transitory computer-readable medium described herein may further include operations, features, means, or instructions for determining to cease transmission of encoded packets corresponding to the set of encoded packets based on the difference and a number of negative acknowledgement messages received from the set of UEs, and transmitting, to the set of UEs, a second set of encoded packets corresponding to a second set of source packets based on determining to cease transmission.

Some examples of the method, apparatuses, and non-transitory computer-readable medium described herein may further include operations, features, means, or instructions for identifying a second set of encoded packets corresponding to a second set of source packets encoded based on a second set of network coding parameters, mapping a first portion of the second set of encoded packets onto one or more resources, and transmitting the first portion of the second set of encoded packets using the one or more resources.

In some examples of the method, apparatuses, and non-transitory computer-readable medium described herein, the first and second subsets of the set of encoded packets may be transmitted to a first group of user equipments (UEs), and the first portion of the second set of encoded packets may be transmitted to a second group of UEs different than the first group of UEs, the second group of UEs associated with a higher channel quality than the first group of UEs.

In some examples of the method, apparatuses, and non-transitory computer-readable medium described herein, the first portion of the second set of encoded packets may be transmitted on a frequency band different from the first and second subsets, and the one or more resources at least partially overlap in time with the second set of resources.

In some examples of the method, apparatuses, and non-transitory computer-readable medium described herein, the first portion of the second set of encoded packets may be associated with a service different from the multicast service channel.

Some examples of the method, apparatuses, and non-transitory computer-readable medium described herein may further include operations, features, means, or instructions for mapping a second portion of the second set of encoded packets onto a third set of resources, and transmitting the second portion of the second set of encoded packets using the third set of resources.

Some examples of the method, apparatuses, and non-transitory computer-readable medium described herein may further include operations, features, means, or instructions for determining a threshold number of packets associated with the first and second sets of resources, and determining the third set of resources based on the threshold number of packets.

In some examples of the method, apparatuses, and non-transitory computer-readable medium described herein, the set of network coding parameters corresponds to a fountain code.

BRIEF DESCRIPTION OF THE DRAWINGS

FIG. 2 illustrates an example of a wireless communications system that supports dynamic coding for wireless systems in accordance with aspects of the present disclosure.

FIG. 3 illustrates an example of a resource allocation scheme that supports dynamic coding for wireless systems in accordance with aspects of the present disclosure.

FIGS. 13 through 16 show flowcharts illustrating methods that support dynamic coding for wireless systems in accordance with aspects of the present disclosure.

DETAILED DESCRIPTION

Figure 1:
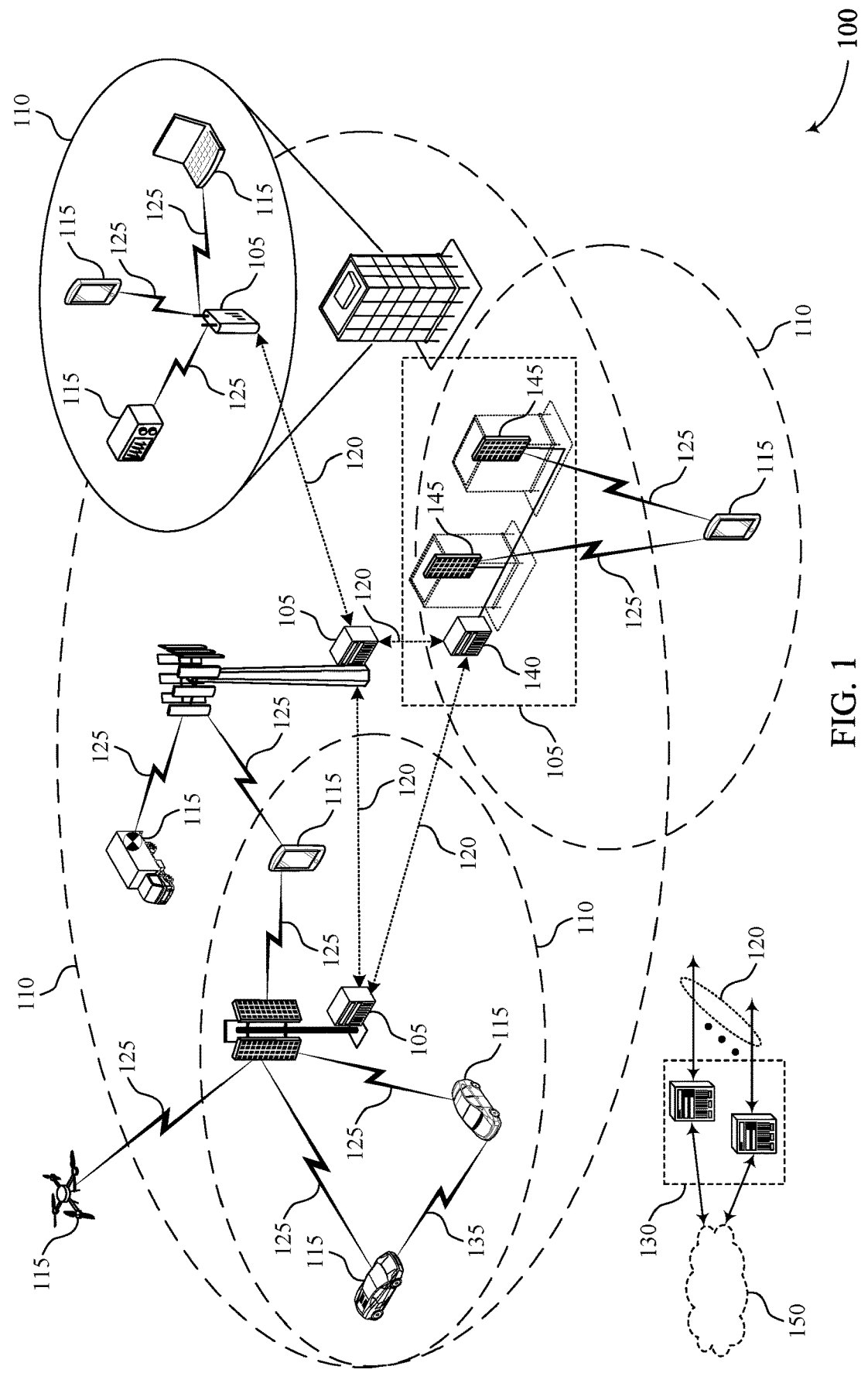
FIG. 1 illustrates an example of a wireless communications system that supports dynamic coding for wireless systems in accordance with aspects of the present disclosure.

Some wireless communications systems may support broadcast services (e.g., a multicast broadcast service (MBS)) where a transmitting device (e.g., a network node, base station, etc.) broadcasts one or more packets to one or more receiving devices (e.g., user equipments (UEs)). In some cases, the one or more packets may be encoded from a set of source packets using a rateless code (a fountain code, a Luby transform (LT) code, a Raptor code, etc.). Rateless codes may not have an intrinsic code rate and so may be used to generate encoded packets indefinitely from a set of source packets. A receiving device may recover the set of source packets from a set of encoded packets if an amount of encoded packets received is greater than the amount of source packets.

In some cases, the transmitting device may broadcast the encoded packets without receiving an indication that the encoded packets have been successfully (or unsuccessfully) decoded by the receiving devices. Accordingly, the transmitting device may broadcast a full set or default number of encoded packets regardless of how many packets a receiving device successfully decodes. Thus, each receiving device may decode the transmission and obtain different numbers of successfully received packets such that a receiving device experiencing a high channel quality may successfully decode the transmission before a receiving device having a low channel quality, which may attempt to decode more encoded packets of the transmission to successfully decode and obtain the source packets. However, broadcast services may not support the use of precoding techniques and as such, the efficiency of the transmission at each receiving device may be reduced. Additionally or alternatively, decoding for rateless codes may stall due to missing or corrupt packets which may lead to an increase in an amount of encoded packets for a successful recovery of the set of source packets. Accordingly, it may be beneficial to dynamically map encoded packets onto resources such that a threshold percentage (e.g., a majority) of UEs associated with a broadcast service may successfully decode broadcast packets.

Some techniques for dynamically mapping encoded packets may include a base station identifying a set of encoded packets associated with an MBS service. In some examples, identifying the set of encoded packets may include encoding a set of source packets using a set of network coding parameters (e.g., using a rateless code). The base station may map the set of encoded packets onto channel resources for transmission. In some examples, the base station may map, to a first set of resources, a first subset of the set of encoded packets including a number of packets below a threshold number or associated with a coding rate below a threshold coding rate. In some implementations, the base station may determine a channel quality associated with one or more UEs subscribed to the MBS service. The base station may determine the threshold based on the channel quality such that a number of the UEs (e.g., a threshold percentage, such as 50%, 70%, 90%, 100%, or a threshold number of UEs) may be able to successfully decode the transmission using the first subset of encoded packets. The base station may map a second subset of the set of encoded packets onto a second set of resources. In some implementations, the first and second subsets of the set of encoded packets may include the entire set of encoded packets. In some examples, the base station may map the first subset of encoded packets using a first coding rate and the second subset of encoded packets using a second, lower coding rate. In some implementations, the set of resources may include symbols, slots, multiple slots, or any combination thereof.

Additionally or alternatively, the base station may schedule one or more resources of the second set of resources for receiving feedback from the UEs. Accordingly, the base station may receive feedback from the UEs using the resources of the second set of resources. In some examples, the base station may receive a negative acknowledgement (NACK) from one or more of the UEs indicating that the transmission was not decoded successfully. In such examples, the base station may continue to transmit encoded packets until the base station receives a positive acknowledgement (ACK) from the UEs for the transmission, which in some cases may correspond to a base station receiving no feedback information at all. In some implementations, the base station may receive, with the NACK message, an indication of a number of additional encoded packets with which the UE may decode the transmission. For instance, if a base station transmits M number of packets, the UE may successfully receive N number of packets, and the UE may report M-N packets indicating to the base station that M-N additional packets are requested for transmission for successful decoding by the UE.

Additionally or alternatively, the base station may identify a set of encoded packets associated with a second set of source packets. The base station may map a portion of the second set of encoded packets onto one or more resources of the second set of resources. In some examples, the base station may interleave the portion of the second set of encoded packets with the second subset of the first set of encoded packets, such that resources of the second set of encoded packets alternate with resources of the first set of encoded packets. In some examples, the base station may map the portion of the second set of encoded packets based on a first threshold which may correspond to the threshold coding rate or number of UEs described above. The base station may map a second portion of the second set of encoded packets onto a third set of resources based on a second threshold. In some examples, the base station may determine the second threshold based on an estimation that a majority of the UEs subscribed to the MBS service would be able to decode the first set of encoded packets successfully.

Particular aspects of the subject matter described herein may be implemented to realize one or more of the following potential advantages. The techniques employed by the described wireless communications systems may provide benefits and enhancements to the operation of the wireless communications system. For example, the described techniques may include features improving a reliability of communications by dynamically mapping encoded packets onto resources based on channel quality indicators measured at a base station. The described techniques include additional features for improving resource use, power consumption, and battery life, data rate, among other benefits.

Aspects of the disclosure are initially described in the context of wireless communications systems. Aspects of the disclosure are further described in the context of resource allocation schemes and process flows. Aspects of the disclosure are further illustrated by and described with reference to apparatus diagrams, system diagrams, and flowcharts that relate to dynamic coding for wireless systems.

FIG. 1 illustrates an example of a wireless communications system 100 that supports dynamic coding for wireless systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Trans-missions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by the base station 105 in different directions and may report to the base station 105 an indi-cation of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feed-back (e.g., a multi-panel type codebook, a linear combina-tion type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support MBS communications services where a transmitting device (e.g., a base station 105, a UE 115, an integrated access and backhaul (IAB) network node, an IAB relay node, etc.) transmits encoded packets to one or more UEs 115. In some implementations, a transmitting device may encode the packets from a set of source packets using a rateless code (e.g., a fountain code, an LT code, a Raptor code, etc.). Rateless codes may not have an intrinsic coding rate and so may be used to generate encoded packets indefinitely from a set of source packets. A receiving device (e.g., a UE 115), may recover the source packets if an amount of encoded packets the receiving device receives is greater than an amount of source packets. If multiple UEs 115 subscribe to a broadcast service, each UE 115 may receive and decode a different number of encoded packets due to, for example, differences in channel quality between the UEs 115. Accordingly, UEs 115 experiencing a high channel quality may recover the source packets before UEs 115 experiencing a low channel quality. However, in some cases, a base station 105 may be operating using a radio link control (RLC) unacknowledged mode (RLC-UM) where the base station 105 does not receive feedback from the UEs 115 indicating whether the UEs 115 successfully or unsuccessfully recovered the source packets. Accordingly, the base station 105 may transmit a full set of encoded packets regardless of how many packets a UE 115 successfully decodes.

To improve reliability of communications or to adjust the number of encoded packets a base station 105 transmits, a base station 105 may dynamically map encoded packets onto resources associated with the broadcast channel. For example, the base station 105 may map a first subset of encoded packets onto a first set of resources using a first coding rate and a second subset of encoded packets onto a second set of resources using a second, lower coding rate. Accordingly, a UE 115 that experiences a high channel quality may recover the source packets using the first subset of encoded packets while a UE 115 that experiences a low channel quality may use the first and second subsets of encoded packets to recover the source packets. Additionally or alternatively, the base station 105 may schedule resources for feedback messages such that a UE 115 may report an acknowledgement/negative acknowledgement (ACK/ NACK) or a number of additional packets with which a UE 115 may recover the source packets. Additionally or alternatively, the base station 105 may interleave resources of the first set of encoded packets with resources associated with a second set of encoded packets such that UEs 115 experiencing a high channel quality may begin to recover a second of source packets while UEs 115 experiencing a low channel quality continue to recover the first set of source packets. Dynamically mapping encoded packets onto resources associated with a broadcast channel may allow a wireless communications system 100 to improve reliability of communications services and use resources efficiently.

FIG. 2 illustrates an example of a wireless communications system 200 that supports dynamic coding for wireless systems in accordance with one or more aspects of the present disclosure. In some examples, the wireless communications system 200 may implement one or more aspects of a wireless communications system 100. The wireless communications system 200 may include a UE 115-a, a UE 115-b, and a UE 115-c which may be examples of a UE 115 as described with reference to FIG. 1. The wireless communications system 200 may also include a base station 105-a which may be an example of a base station 105 as described with reference to FIG. 1. The base station 105-a may be associated with a cell which provides wireless communications service with a coverage area 110-a.

The wireless communications system 200 may support network coding techniques. For example, a transmitting device 205 may encode a set of K source packets 220 using one or more network coding techniques. For examples, the transmitting device 205 may encode the K source packets 220 using a rateless code (e.g., a fountain code, an LT code, a Raptor code, etc.). Encoding the K source packets 220 may yield a set of N encoded packets 225, which the transmitting device 205 may transmit to one or more receiving devices 215 (e.g., UEs 115-a, 115-b, and 115-c). A receiving device may receive a set of L encoded packets 230. In some examples, L may be less than or equal to N based on, for example, channel conditions experienced by the receiving device 215. If the L is greater than K, that is, if the set of L encoded packets 230 is larger than the set of K source packets 220, the receiving device 215 may successfully recover the set of source packets 220.

In some examples, the wireless communications system 200 may support MBS communications services where the base station 105-a, which may be an example of a transmitting device 205, transmits encoded packets to the UEs 115-a, 115-b, and 115-c which may be examples of receiving devices 215. In some examples, the base station 105-a may operate in RLC-UM, where the base station 105-a transmits encoded packets without receiving feedback from the UEs 115-a, 115-b, or 115-c indicating whether the UEs 115-a, 115-b, or 115-c successfully recovered the source packets. Accordingly, the base station 105-a may transmit a full set of encoded packets. The UEs 115-a, 115-b, and 115-c may recover the source packets using different numbers of encoded packets based on channel conditions experienced by each UE 115. That is, each of the UEs 115-a, 115-b, and 115-c may successfully decode the source packets if the number of successfully received packets is greater than the number of source packets (K), but may unsuccessfully decode the source packets if the number of successfully received packets is less than the number of source packets (K). In such cases, depending on channel conditions and decoding success, some UEs 115 may successfully decode the transmitted packets, and others may not.

To improve reliability of communications, the base station 105-a may dynamically map encoded packets onto channel resources. For example, the base station 105-a may map a first subset of encoded packets onto a first set of resources 235 and a second subset of encoded packets onto a second set of resources 240 associated with a broadcast channel (e.g., a physical broadcast channel (PBCH)). The base station 105-*a* may map the first set of resources 235 using a first coding rate and the second set of resources 240 using a second, lower coding rate. In some implementations, the second coding rate may be half of the first coding rate. Accordingly, the UEs 115-*a*, 115-*b*, and 115-*c* may receive some or all of the encoded packets mapped onto the sets of resources 235 and 240. For example, the UE 115-*a* may receive the first subset of encoded packets on the first set of resources 235 and recover the source packets. In some examples, the UE 115-*a* may receive transmissions associated with a different service using a third set of resources 245. For example, the UE 115-*a* may monitor a third set of resources 245 which may occur during a same period as the second set of resources 240 but may use a different frequency band. The UE 115-*a* may receive a second set of encoded packets (which may be associated with a second set of source packets different from the first set of source packets) using the third set of resources 245. Accordingly, the UE 115-*a* may experience a high data rate by receiving the second set of encoded packets and obtaining the second set of source packets different from the first set of source packets. The UE 115-*b* may receive the first subset of encoded packets using the first set of resources 235 and may fail to recover the source packets. Accordingly, the UE 115-*b* may receive the second subset of encoded packets using the second set of resources 240 and may successfully recover the source packets. Accordingly, the UE 115-*b* may experience a high reliability associated with the communications service. The number of encoded packets received and decoded by the UEs 115-*a*, 115-*b*, and 115-*c* may be based on channel conditions experienced by each of the UEs 115.

Additionally or alternatively, the base station 105-*a* may schedule resources for receiving feedback on the second set of resources 240. The base station 105-*a* may receive feedback from any of UEs 115-*a*, 115-*b*, or 115-*c* that failed to successfully recover the source packets using the first subset of encoded packets transmitted on the first set of resources 235. For example, the UE 115-*c* may fail to successfully recover the source packets using the first subset of encoded packets received using the first set of resources 235. Accordingly, the UE 115-*c* may transmit a feedback message to the base station 105-*a* using one or more resources from the second set of resources 240. In some examples, the UE 115-*c* may transmit a NACK message to the base station 105-*a* indicating that the UE 115-*c* failed to recover the source packets. The UE 115-*c* may also transmit, to the base station 105-*a*, an indication of a number of additional packets with which the UE 115-*c* may recover the source packets. Based on the feedback transmitted from the UE 115-*c*, the base station 105-*a* may determine whether to transmit additional encoded packets using a third set of resources 245, or to transmit a new set of encoded packets corresponding to a new set of source packets.

Additionally or alternatively, the base station 105-*a* may identify a second set of encoded packets associated with a second set of source packets. The base station 105-*a* may map a first subset of the second set of encoded packets onto one or more resources associated with the second set of resources 235. For example, the base station 105-*a* may interleave packets from the second set of encoded packets with packets from the first set of encoded resources such that resources associated with the first set of encoded packets alternate with resources associated with the second set of encoded packets. The base station 105-*a* may also map a second subset of the second set of encoded packets onto a third set of resources 245. Accordingly, the UEs 115-*a*, 115-*b*, and 115-*c* may receive encoded packets based on whether the UEs 115-*a*, 115-*b*, and 115-*c* have recovered the first set of source packets, the second set of source packets, or both. For example, the UE 115-*a* may receive the encoded packets on the first set of resources 235 and may successfully recover the associated source packets. The UE 115-*a* may receive the encoded packets associated with the second set of encoded packets using the second set of resources 240 such that the UE 115-*a* may begin to recover the second set of source packets. Similarly, the UE 115-*b* may receive the encoded packets from the first set of encoded packets on the first set of resources 235 and may fail to recover the first set of source packets. Accordingly, the UE 115-*b* may receive encoded packets from the first set of encoded packets using the second set of resources 240 and may recover the first set of source packets. The UE 115-*b* may receive the encoded packets from the second set of encoded packets on the third set of resources 245 and may being to recover the second set of source packets. The UE 115-*c* may exhibit behavior similar to that of the UEs 115-*a* and 115-*b* based on channel conditions. Dynamically mapping encoded packets onto resources associated with a broadcast channel may allow the wireless communications system 200 to improve reliability of communications services and use resources efficiently.

Figure 3:
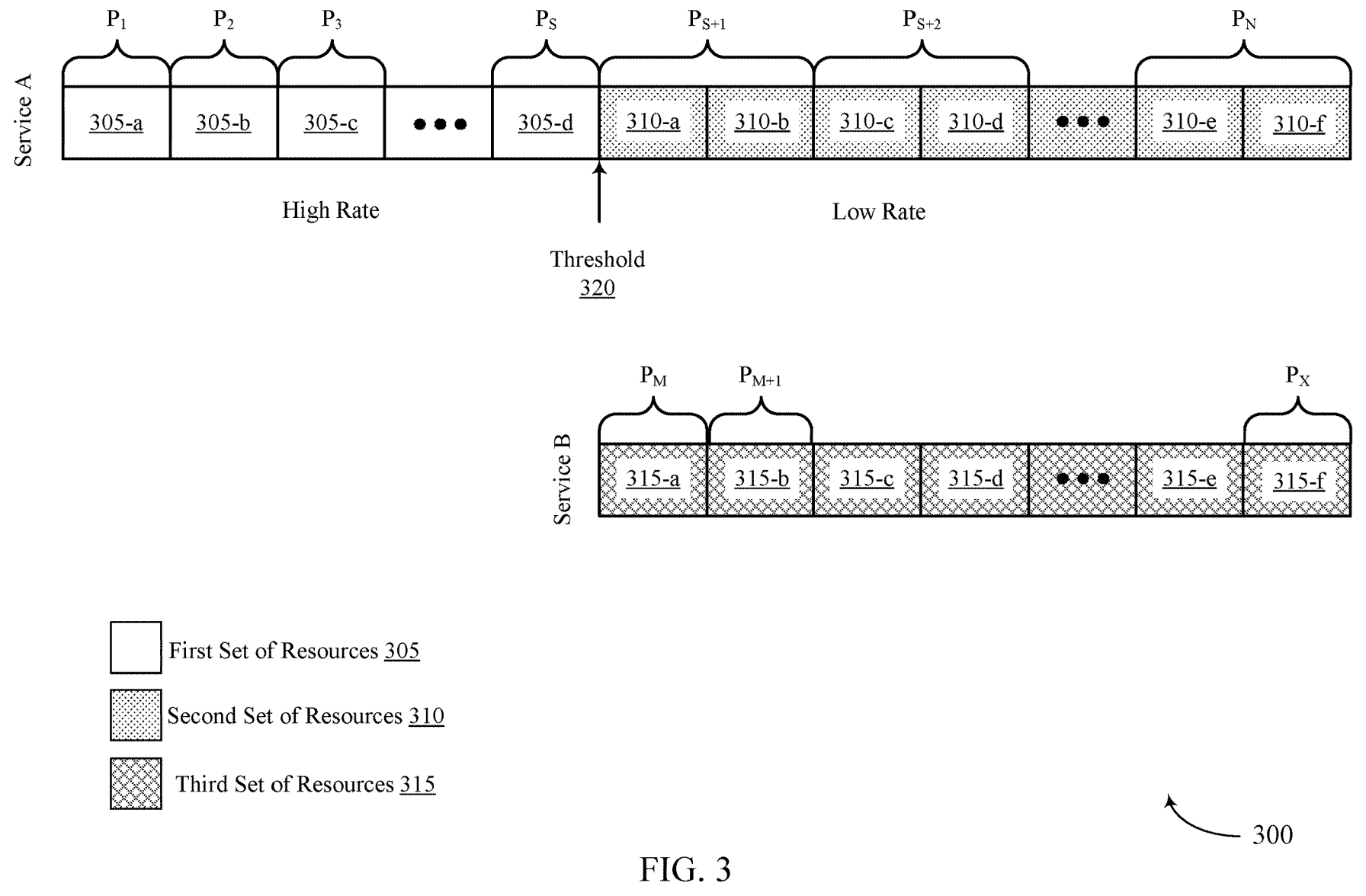

FIG. 3 illustrates an example of a resource allocation scheme 300 that supports dynamic coding for wireless systems in accordance with one or more aspects of the present disclosure. In some examples, the resource allocation scheme 300 may implement aspects of a wireless communications systems 100 or 200 as described with reference to FIGS. 1 and 2. In some examples, the resource allocation scheme 300 may be implemented by a base station 105, one or more UEs 115, or any combination thereof as described with reference to FIG. 1. The resource allocation scheme 300 may be an example of a resource allocation scheme used by a base station 105 to dynamically map encoded packets for broadcast transmission.

A base station 105 may map a first subset of encode packets $P_1$ to $P_s$ onto a first set of resources 305. For example, a base station 105 may map a packet $P_1$ onto a resource 305-*a*, a packet $P_2$ onto a resource 305-*b*, a packet $P_3$ onto a resource 305-*c* and so on until a packet $P_s$ is mapped onto a resource 305-*d*. In some examples, the base station 105 may map the encoded packets onto the first set of resources 305 using a first coding rate. The number of packets S may correspond to a threshold 315 where the threshold 315 is determined based on channel conditions associated with one or more UEs 115.

The base station 105 may map a second subset of encoded packets $P_{S+1}$ to $P_N$ onto a second set of resources 310 using a second, lower coding rate. For example, the base station 105 may map a packet $P_{S+1}$ onto resources 310-*a* and 310-*b*, a packet $P_{S+2}$ onto resources 310-*c* and 310-*d* and so on until a packet $P_N$ is mapped onto resources 310-*e* and 310-*f*.

Accordingly, a UE 115 may receive the first subset of packets, the second subset of packets, or both to recover a set of source packets associated with the encoded packets. In some examples, a number of encoded packets used by the UE 115 to recover the source packets may be based on channel conditions experienced by the UE. In some implementations, resources 305 and 310 may be examples of symbols, slots, frames, or any combination thereof.

In some examples, packets $P_1$ through $P_N$ may be associated with a first service (e.g., Service A), which may be an MBS service to which a set of UEs are subscribed. UEs 115 that have successfully decoded packets $P_1$ through $P_S$ to obtain the set of source packets (e.g., UEs 115 having a relatively good channel quality, such as a channel quality above a threshold) may monitor for a second service (e.g., Service B) during the time in which the base station transmits the second set of resources 310. For instance, the UEs 115 may monitor a third set of resources 315, which may be associated with a different MBS service or non-MBS service, or a different carrier or subcarrier, to decode a second set of source packets associated with data different than the source packets associated with packets $P_1$ through $P_N$. In some implementations the UEs 115 may monitor the third set of resources 315 during a same time period as the second set of resources 310 but over a different frequency band, which may be indicated by the base station 105. That is, one or more UEs 115 may monitor the third set of resources 315 to decode encoded packets $P_M$ through $P_X$, which may correspond to a new set of source packets during a time duration that at least partially overlaps the second set of resources 310. This may allow for UEs 115 with higher channel quality to have higher throughput by receiving source packets associated with Services A and B, while allowing UEs 115 with lower channel quality additional resources for successfully decoding the source packets associated with Service A. In some examples, a UE 115 may fail to decode the source packets associated with Service A using encoded packets $P_1$ through $P_S$, but may successfully decode the source packets associated with Service A using a subset of the encoded packets $P_{S+1}$ through $P_N$. Accordingly, after successfully decoding the source packets associated with Service A, the UE 115 may monitor for one or more of encoded packets $P_M$ through $P_X$ using the different frequency band in an attempt to decode source packets associated with a second set of source packets (e.g., Service B source packets), which may allow the UE 115 to experience a higher data throughput.

Figure 4:
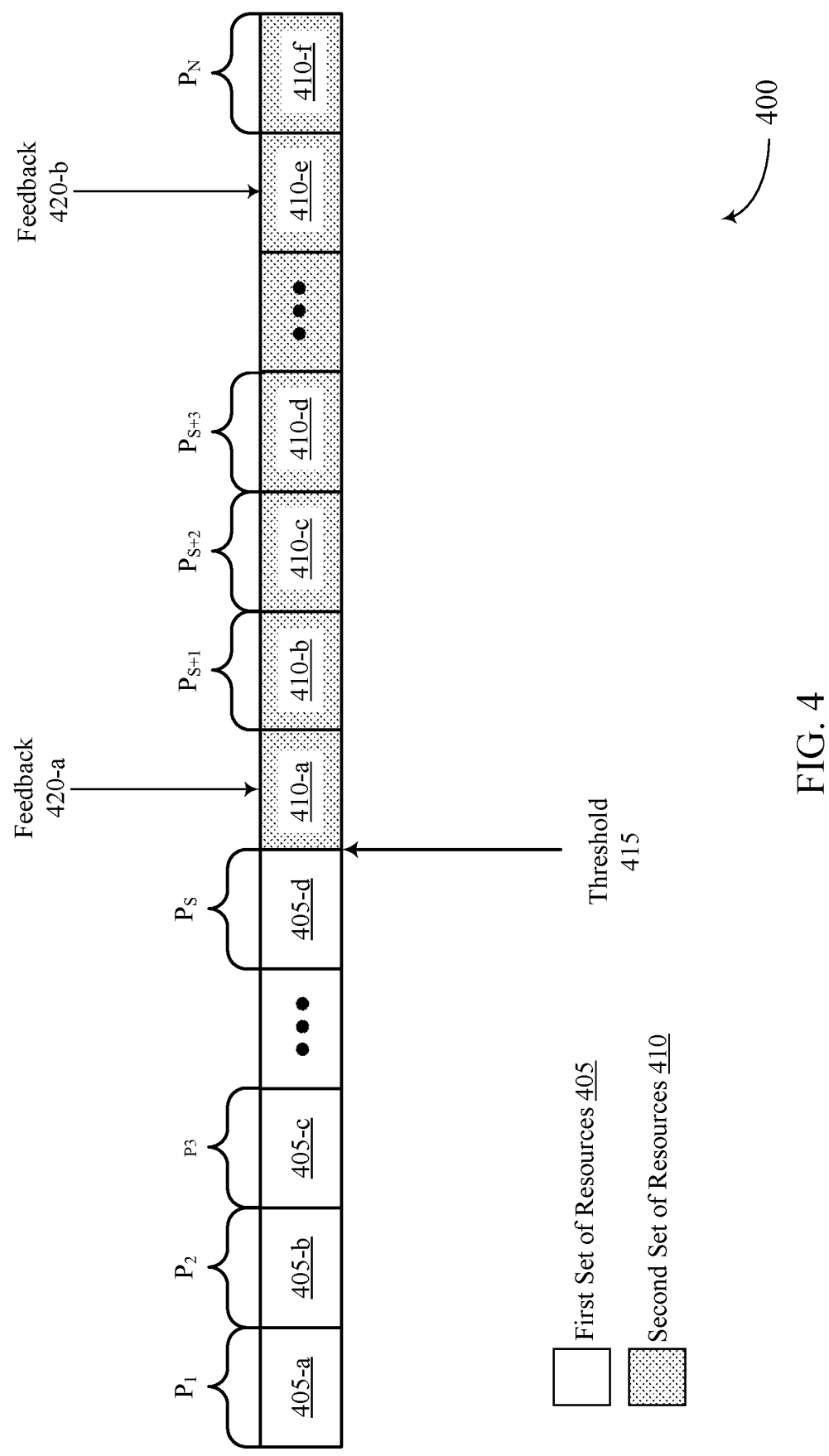
FIG. 4 illustrates an example of a resource allocation scheme that supports dynamic coding for wireless systems in accordance with aspects of the present disclosure.

FIG. 4 illustrates an example of a resource allocation scheme 400 that supports dynamic coding for wireless systems in accordance with one or more aspects of the present disclosure. In some examples, the resource allocation scheme 400 may implement aspects of a wireless communications systems 100 or 200, a resource allocation 300, or any combination thereof as described with reference to FIGS. 1-3. In some examples, the resource allocation scheme 400 may be implemented by a base station 105, one or more UEs 115, or any combination thereof as described with reference to FIG. 1. The resource allocation scheme 400 may be an example of a resource allocation schemed used by a base station 105 to dynamically map encoded packets for broadcast transmission.

The base station 105 may map a first subset of encode packets $P_1$ to $P_S$ onto a first set of resources 405. For example, the base station 105 may map a packet $P_1$ onto a resource 405-$a$, a packet $P_2$ onto a resource 405-$b$, a packet $P_3$ onto a resource 405-$c$ and so on until a packet $P_S$ is mapped onto a resource 405-$d$. The number of packets S may correspond to a threshold 415 where the threshold 415 is determined based on channel conditions associated with one or more UEs 115.

The base station 105 may map a second subset of encoded packets $P_{S+1}$ to $P_N$ onto a second set of resources 410. For example, the base station 105 may map a packet $P_{S+1}$ onto a resource 410-$b$, a packet $P_{S+2}$ onto a resource 410-$c$, a packet $P_{S+2}$ onto a resource 410-$d$, and so on until a packet $P_N$ is mapped onto a resource 410-$f$. The base station 105 may schedule feedback 420 onto one or more resources from the second set of resources. For example, the base station 105 may schedule feedback 420-$a$ onto the resource 410-$a$ and feedback 420-$b$ onto the resource 410-$e$.

Accordingly, a UE 115 may receive the first subset of packets, the second subset of packets, or both to recover a set of source packets associated with the encoded packets. The UE 115 may indicate feedback information to the base station 105 including ACK/NACK messages, an indication of a number of additional packets, or any combination thereof. The base station 105 may receive feedback information such as a NACK message from one or more UEs and may determine to transmit packets using the second set of resources until feedback 420-$b$. In some cases, the base station 105 may not receive any feedback messages, and may determine that all UEs 115 have successfully recovered the set of source packets using packets $P_1$ through $P_S$, and may refrain from transmitting packets $P_{S+1}$ through $P_N$ using the second set of resources 410. In such cases, the base station 105 may transmit packets associated with a different set of source packets different from the set of source packets associated with packets $P_1$ through $P_S$. In examples where the base station 105 receives an indication of the number of packets received by one or more UEs 115 or a difference between the number of packets for successful decoding by a UE 115 and a number of packets decoded by the UE 115, the base station 105 may determine whether to transmit using the second set of resources 410 or refrain from transmitting. For instance, if the difference between the number of packets for successful decoding by a UE 115 and a number of packets decoded by the UE 115 is above a threshold difference, or the number of UEs 115 transmitting NACK is below a threshold number, the base station 105 may refrain from transmitting packets using the second set of resources 410. Alternatively, if the difference between the number of packets for successful decoding by a UE 115 and a number of packets decoded by the UE 115 is below a threshold difference, or the number of UEs 115 transmitting NACK is above a threshold number, the base station 105 may transmit packets using the second set of resources 410.

In some examples, a number of encoded packets used by the UE 115 to recover the source packets may be based on channel conditions experienced by the UE. In some implementations, resources 405 and 410 may be examples of symbols, slots, frames, or any combination thereof.

Figure 5:
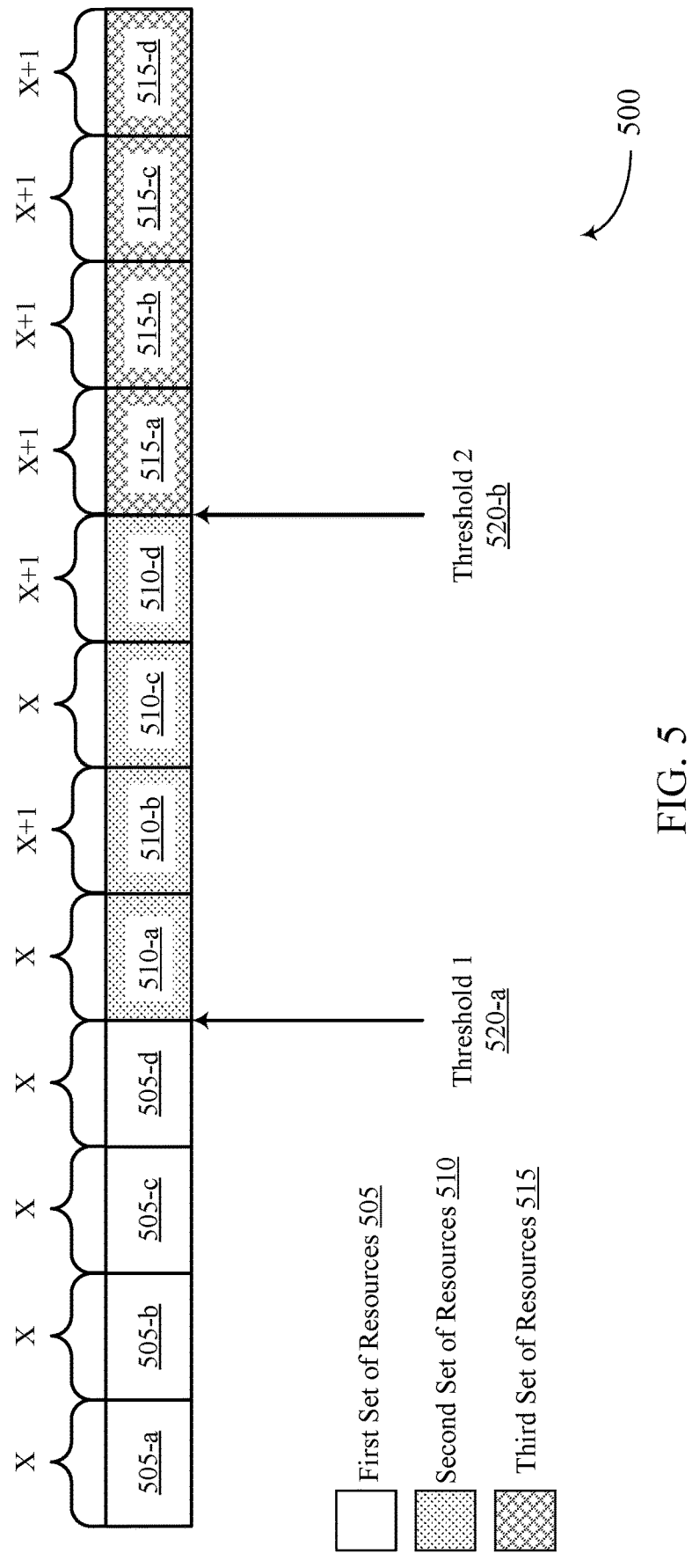
FIG. 5 illustrates an example of a resource allocation scheme that supports dynamic coding for wireless systems in accordance with aspects of the present disclosure.

FIG. 5 illustrates an example of a resource allocation scheme 500 that supports dynamic coding for wireless systems in accordance with one or more aspects of the present disclosure. In some examples, the resource allocation scheme 500 may implement aspects of a wireless communications system 100 or 200, a resource allocation schemes 300 or 400, or any combination thereof as described with reference to FIGS. 1-4. In some examples, the resource allocation scheme 500 may be implemented by a base station 105, one or more UEs 115, or any combination thereof as described with reference to FIG. 1. The resource allocation scheme 500 may be an example of a resource allocation schemed used by a base station 105 to dynamically map encoded packets for broadcast transmission.

The base station may map a first subset of a first set of encoded packets onto a first set of resources 505. For example, the base station may map packets X from the first set of encoded packets onto the resources 505-$a$, 505-$b$, 505-$c$, and 505-$d$. In some examples, a number of encoded packets may correspond to a first threshold 520-$a$ determined based on channel conditions associated with one or more UEs 115.

The base station may map a second subset of the first set of encoded packets and a first subset of a second set of encoded packets onto a second set of resource 510. For example, the base station may map a packet X from the first set of encoded packets onto the resource 510-*a*, a packet X+1 from the second set of encoded packets onto the resource 510-*b*, a packet X from the first set of encoded packets onto the resource 510-*c*, and a packet X+1 from the second set of encoded packets onto the resource 510-*d*. In some examples, a number of packets associated with the second set of resources 510 may correspond to a second threshold 520-*b*.

The base station may map a second subset of the second set of encoded packets onto a third set of resources 515. For example, the base station 105 may map a set of packets X+1 onto resources 515-*a*, 515-*b*, 515-*c*, and 515-*b*.

Accordingly, a UE 115 may receive the first subset of packets, the second subset of packets, or both to recover a set of source packets associated with the encoded packets. The UE 115 may receive the second set of encoded packets using the second or third sets of resources to recover a second set of source packets. In some examples, a number of encoded packets used by the UE 115 to recover the source packets may be based on channel conditions experienced by the UE. In some implementations, resources 405 and 410 may be examples of symbols, slots, frames, or any combination thereof.

Figure 6:
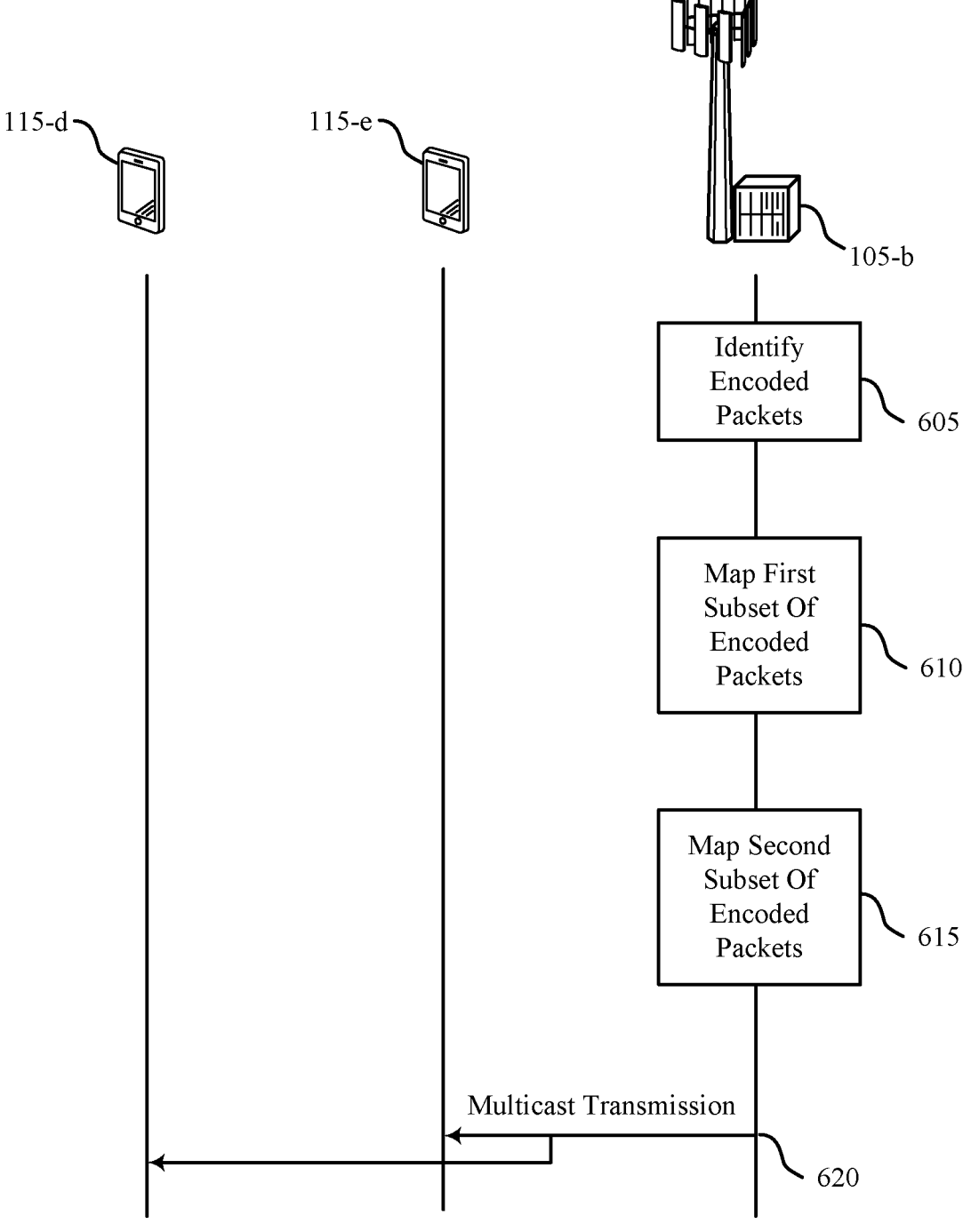
FIG. 6 illustrates an example of a process flow that supports dynamic coding for wireless systems in accordance with aspects of the present disclosure.

FIG. 6 illustrates an example of a process flow 600 that supports dynamic coding for wireless systems in accordance with one or more aspects of the present disclosure. In some examples, the process flow 600 may implement aspects of a wireless communications system 100 or 200, resource allocation schemes 300, 400 or 500, or any combination thereof as described with reference to FIGS. 1-5. The process flow 600 may include a UE 115-*d*, a UE 115-*e*, and a base station 105-*b* which may be examples of the corresponding devices described herein. Alternative examples of the following may be implemented where some processes are performed in a different order than described or not performed at all. In some implementations, processes may include additional features not mentioned below, or further processes may be added.

At 605, the base station 105-*b* may identify a set of encoded packets. In some examples, the encoded packets may be encoded using a set of network coding parameters. For example, the base station 105-*b* may encode a set of source packets using a rateless code (e.g., a fountain code, an LT code, a Raptor code, etc.).

At 610, the base station 105-*b* may map a first subset of the set of encoded packets onto a first set of resources. In some example, the first subset of encoded packets may have a number of packets which corresponds to a threshold determined by the base station 105-*b*. In some examples, the base station 105-*b* may determine the threshold based on channel conditions associated with the UE 115-*d* and the UE 115-*e*. In some implementations, the base station 105-*b* may determine the threshold based on an estimation that a majority of UEs 115 subscribed to the broadcast service will be able to recover the source packets. The base station 105-*b* may map the first subset of encoded packets using a first coding rate.

At 615, the base station 105-*b* may map a second subset of the set of encoded packets onto a second set of resources. In some examples, the second subset of encoded packets may include all packets of the set of encoded packets which were not included in the first subset. The base station 105-*b* may map the second subset of encoded packets using a second coding rate where the second coding rate is lower than the first coding rate. For example, the base station 105-*b* may use twice as many resources for each packet of the second subset of packets as used for the first subset of packets.

At 620, the base station 105-*b* may transmit the encoded packets in a multicast transmission to the UE 115-*d* and the UE 115-*e*. Accordingly, the UE 115-*d* and the UE 115-*e* may attempt to recover the source packets using one or more of the transmitted encoded packets. In some examples, if the UE 115-*e* successfully recovers the source packets using the first subset of packets, the UE 115-*e* may use the second set of resources to receive new data or transmissions associated with a different broadcast service.

Implementing various aspects of the process flow 600 may allow the base station 105-*b* to dynamically map encoded packets onto channel resources, thereby improving reliability and efficiency of broadcast services.

Figure 7:
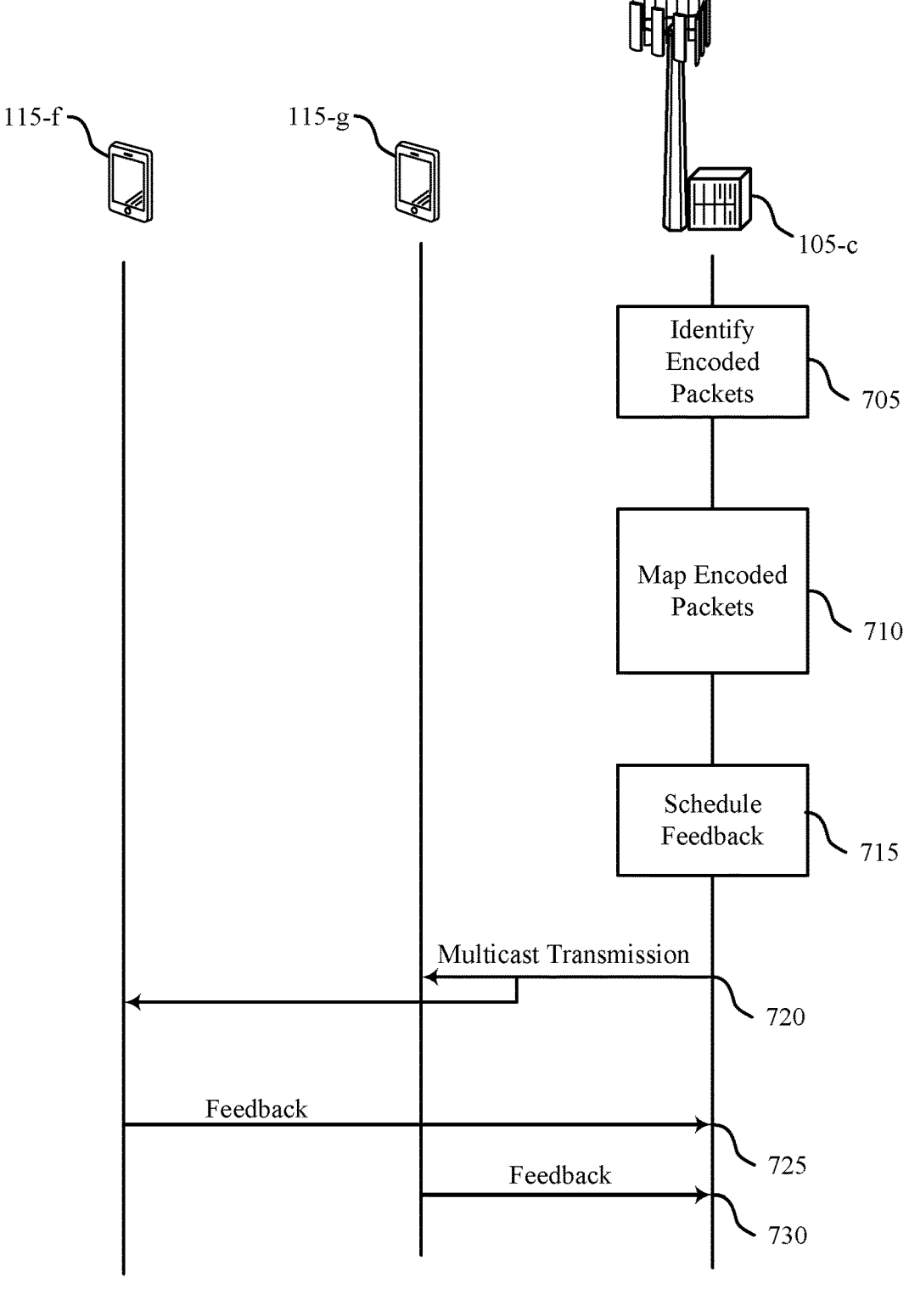
FIG. 7 illustrates an example of a process flow that supports dynamic coding for wireless systems in accordance with aspects of the present disclosure.

FIG. 7 illustrates an example of a process flow 700 that supports dynamic coding for wireless systems in accordance with one or more aspects of the present disclosure. In some examples, the process flow 700 may implement aspects of a wireless communications system 100 or 200, resource allocation schemes 300, 400 or 500, a process flow 600, or any combination thereof as described with reference to FIGS. 1-6. The process flow 700 may include a UE 115-*f*, a UE 115-*g*, and a base station 105-*c* which may be examples of the corresponding devices described herein. Alternative examples of the following may be implemented where some processes are performed in a different order than described or not performed at all. In some implementations, processes may include additional features not mentioned below, or further processes may be added.

At 705, the base station 105-*c* may identify a set of encoded packets. In some examples, the encoded packets may be encoded using a set of network coding parameters. For example, the base station 105-*c* may encode a set of source packets using a rateless code (e.g., a fountain code, an LT code, a Raptor code, etc.).

At 710, the base station 105-*c* may map the set of encoded packets onto channel resources. The base station 105-*c* may map a first subset of the encoded packets onto a first set of resources and a second subset of the encoded packets onto a second set of resources. In some examples, a number of packets mapped to the first and second sets of resources may correspond to a threshold determined by the base station 105-*c*. In some examples, the base station 105-*c* may determine the threshold based on channel conditions associated with the UE 115-*d* and the UE 115-*e*. In some implementations, the base station 105-*c* may determine the threshold based on an estimation that a majority of UEs 115 subscribed to the broadcast service will be able to recover the source packets.

At 715, the base station 105-*c* may schedule one or more resources from the second set of resources for receiving feedback from the UEs 115-*f* and 115-*g*.

At 720, the base station 105-*c* may transmit the encoded packets in a multicast message to the UEs 115-*f* and 115-*g* using the first and second sets of resources.

At 725 and 730, the UEs 115-*f* and 115-*g* may transmit feedback messages to the base station 105-*c*. In some examples, the feedback messages may include an ACK or NACK message for the transmitted packets. The feedback messages may also include an indication of a number of encoded packets with which the UE 115 would be able to recover the source packets. For example, if the UE 115-*g* failed to recover the source packets using the first and second subsets of encoded packets, the UE 115-*g* may indicate a number of additional packets required to recover the source packets.

Implementing various aspects of the process flow 700 may allow the base station 105-*c* to dynamically map encoded packets onto channel resources, thereby improving reliability and efficiency of broadcast services.

Figure 8:
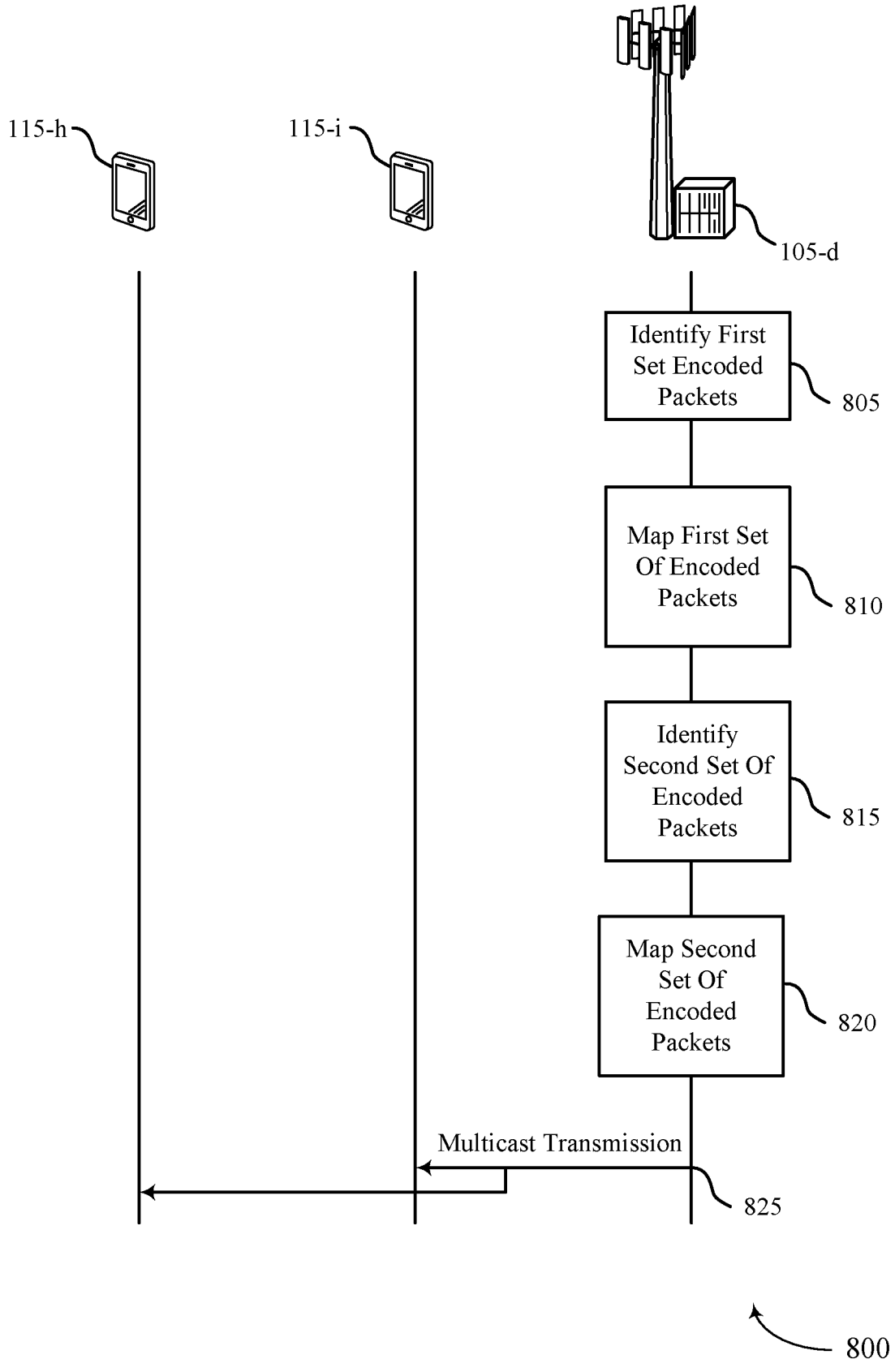
FIG. 8 illustrates an example of a process flow that supports dynamic coding for wireless systems in accordance with aspects of the present disclosure.

FIG. 8 illustrates an example of a process flow 800 that supports dynamic coding for wireless systems in accordance with one or more aspects of the present disclosure. In some examples, the process flow 800 may implement aspects of a wireless communications system 100 or 200, resource allocation schemes 300, 400 or 500, a process flow 600 or 700, or any combination thereof as described with reference to FIGS. 1-7. The process flow 800 may include a UE 115-*h*, a UE 115-*i*, and a base station 105-*d* which may be examples of the corresponding devices described herein. Alternative examples of the following may be implemented where some processes are performed in a different order than described or not performed at all. In some implementations, processes may include additional features not mentioned below, or further processes may be added.

At 805, the base station 105-*d* may identify a first set of encoded packets. In some examples, the encoded packets may be encoded using a set of network coding parameters. For example, the base station 105-*d* may encode a first set of source packets using a rateless code (e.g., a fountain code, an LT code, a Raptor code, etc.).

At 810, the base station 105-*d* may map the first set of encoded packets onto sets of channel resources. For example, the base station 105-*d* may map a first subset of encoded packets onto a first set of resources and a second subset of encoded packets onto a second set of resources based on a first predetermined threshold. In some examples, the base station 105-*c* may determine the first threshold based on channel conditions associated with the UE 115-*i* and the UE 115-*e*. In some implementations, the base station 105-*d* may determine the threshold based on an estimation that a majority of UEs 115 subscribed to the broadcast service will be able to recover the source packets.

At 815, the base station 105-*d* may identify a second set of encoded packets. In some examples, the encoded packets may be encoded using a set of network coding parameters. For example, the base station 105-*d* may encode a second set of source packets using a rateless code (e.g., a fountain code, an LT code, a Raptor code, etc.).

At 820, the base station 105-*d* may map the second set of encoded packets onto resources. For example, the base station 105-*d* may map a first subset of the second set of encoded packets onto the second set of resources such that resources associated with the second set of encoded packets alternate with resources associated with the first set of encoded packets. The base station 105-*d* may also map a second subset of the second set of encoded packets onto a third set of resources based on a second predetermined threshold. In some examples, the base station 105-*d* may determine the second threshold using a procedure similar to the process used to determine the first threshold.

At 825, the base station 105-*d* may transmit the first and second sets of encoded packets using the first, second, and third sets of resources. Accordingly, the UEs 115-*h* and 115-*i* may receive the first and second sets of encoded packets and recover the first and second sets of source packets. In some examples, if the UE 115-*h* experiences a higher channel quality than the UE 115-*i*, the UE 115-*h* may recover the source packets using a lower number of encoded packets than the UE 115-*i*. Accordingly, the UE 115-*h* may receive new data associated with the second set of source packets while the UE 115-*i* is attempting to recover the first set of source packets.

Implementing various aspects of the process flow 800 may allow the base station 105-*c* to dynamically map encoded packets onto channel resources, thereby improving reliability and efficiency of broadcast services.

Figure 9:
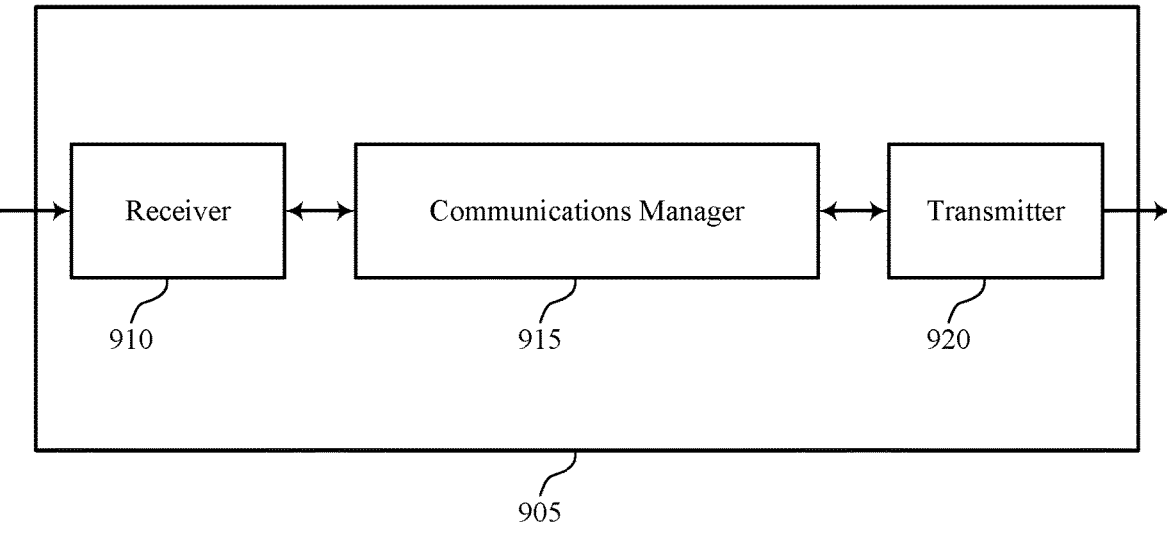
FIGS. 9 and 10 show block diagrams of devices that support dynamic coding for wireless systems in accordance with aspects of the present disclosure.

FIG. 9 shows a block diagram 900 of a device 905 that supports dynamic coding for wireless systems in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic coding for wireless systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a set of encoded packets associated with a multicast service channel, the set of encoded packets corresponding to a set of source packets encoded based on a set of network coding parameters, map a first subset of the set of encoded packets onto a first set of resources of the multicast service channel based on the first set of resources being associated with a first coding rate greater than a threshold coding rate, map a second subset of the set of encoded packets onto a second set of resources of the multicast service channel based on the second set of resources being associated with a second coding rate less than the threshold coding rate, and transmit the first subset of the set of encoded packets using the first set of resources and the second subset of the set of encoded packets using the second set of resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described may be implemented to realize one or more potential advantages. One implementation may allow the device 605 to dynamically map encoded packets onto resources associated with a broadcast channel. Based on the techniques for dynamically mapping encoded packets, the device 605 may support adjusting a number of transmitted packets such that receiving devices may successfully recover data. As such, the device 605 may exhibit improved reliability or reduced resource usage, among other benefits.

Figure 10:
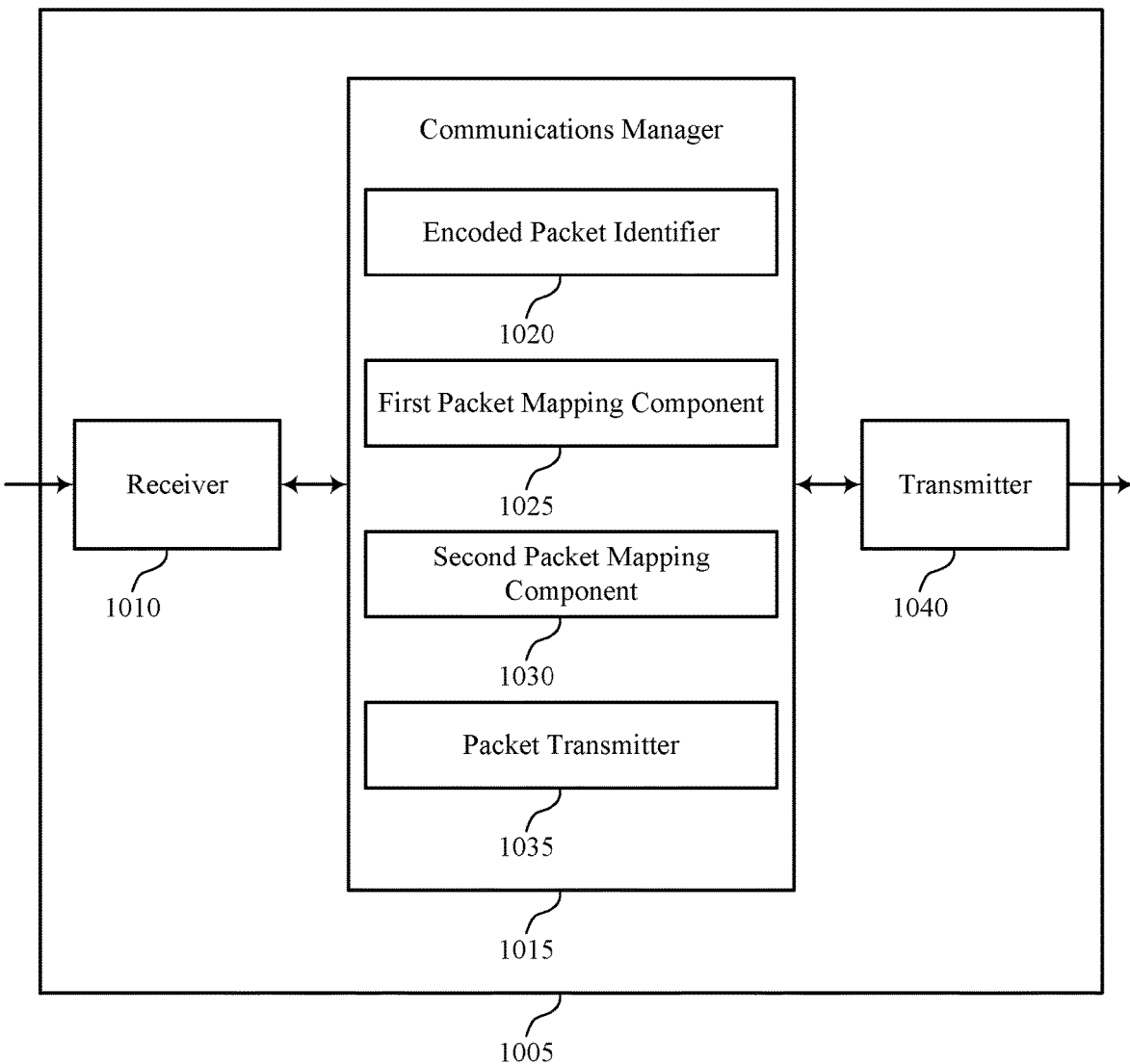

FIG. 10 shows a block diagram 1000 of a device 1005 that supports dynamic coding for wireless systems in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic coding for wireless systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an encoded packet identifier 1020, a first packet mapping component 1025, a second packet mapping component 1030, and a packet transmitter 1035. The communications manager 1015 may be an example of aspects of the communications manager 1210 described herein.

The encoded packet identifier 1020 may identify a set of encoded packets associated with a multicast service channel, the set of encoded packets corresponding to a set of source packets encoded based on a set of network coding parameters.

The first packet mapping component 1025 may map a first subset of the set of encoded packets onto a first set of resources of the multicast service channel based on the first set of resources being associated with a first coding rate greater than a threshold coding rate.

The second packet mapping component 1030 may map a second subset of the set of encoded packets onto a second set of resources of the multicast service channel based on the second set of resources being associated with a second coding rate less than the threshold coding rate.

The packet transmitter 1035 may transmit the first subset of the set of encoded packets using the first set of resources and the second subset of the set of encoded packets using the second set of resources.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
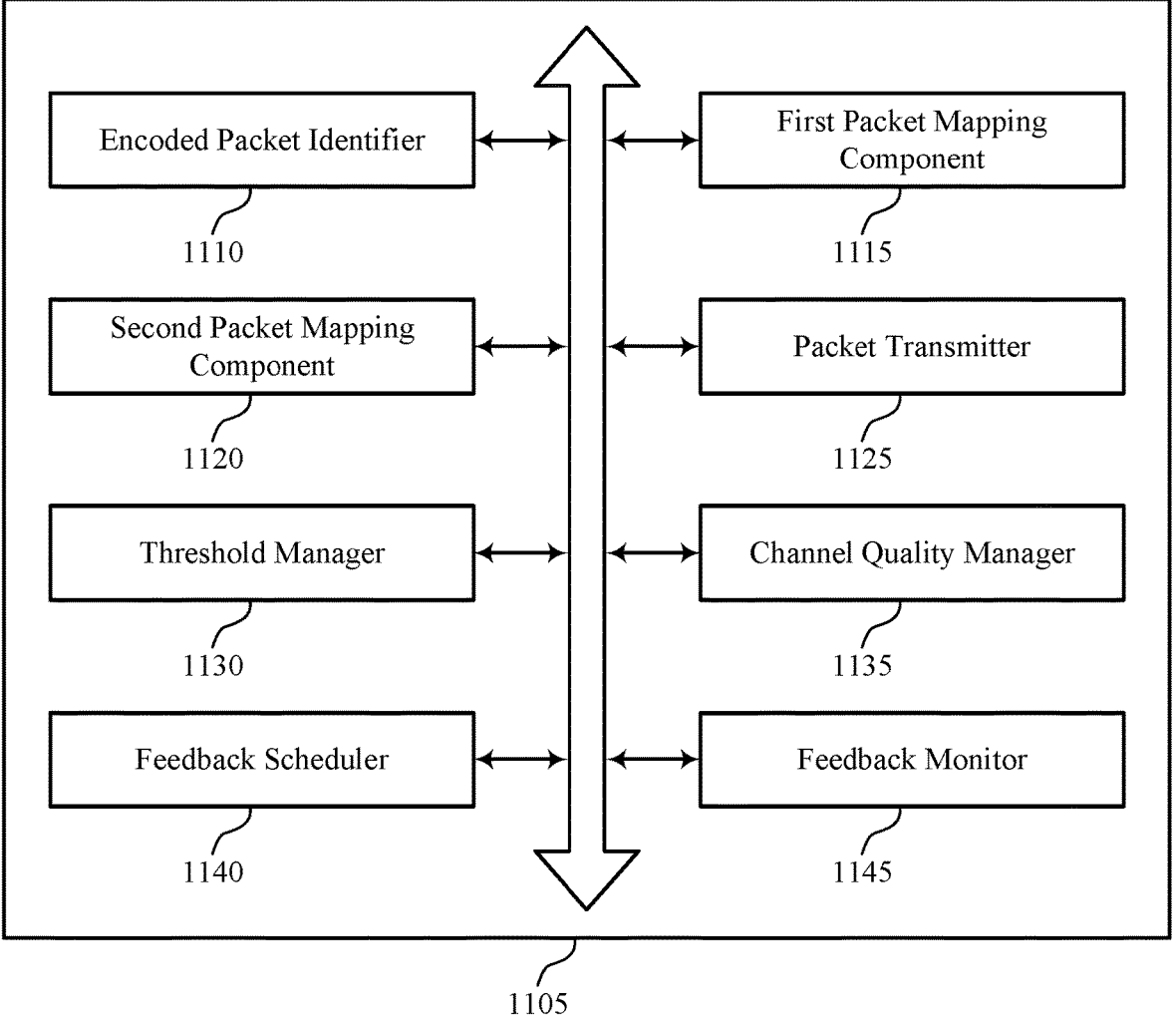
FIG. 11 shows a block diagram of a communications manager that supports dynamic coding for wireless systems in accordance with aspects of the present disclosure.

FIG. 11 shows a block diagram 1100 of a communications manager 1105 that supports dynamic coding for wireless systems in accordance with aspects of the present disclosure. The communications manager 1105 may be an example of aspects of a communications manager 915, a communications manager 1015, or a communications manager 1210 described herein. The communications manager 1105 may include an encoded packet identifier 1110, a first packet mapping component 1115, a second packet mapping component 1120, a packet transmitter 1125, a threshold manager 1130, a channel quality manager 1135, a feedback scheduler 1140, and a feedback monitor 1145. Each of these modules may communicate, directly or indirectly, with one another (e.g., via one or more buses).

The encoded packet identifier 1110 may identify a set of encoded packets associated with a multicast service channel, the set of encoded packets corresponding to a set of source packets encoded based on a set of network coding parameters.

In some examples, the encoded packet identifier 1110 may identify a second set of encoded packets corresponding to a second set of source packets encoded based on a second set of network coding parameters.

In some cases, the set of network coding parameters corresponds to a fountain code.

The first packet mapping component 1115 may map a first subset of the set of encoded packets onto a first set of resources of the multicast service channel based on the first set of resources being associated with a first coding rate greater than a threshold coding rate.

In some examples, the first packet mapping component 1115 may map the first subset of the set of encoded packets to a first set of symbols of a first slot period.

In some examples, the first packet mapping component 1115 may map a first portion of the second set of encoded packets onto one or more resources.

The second packet mapping component 1120 may map a second subset of the set of encoded packets onto a second set of resources of the multicast service channel based on the second set of resources being associated with a second coding rate less than the threshold coding rate.

In some examples, the second packet mapping component 1120 may map the second subset of the set of encoded packets to a second set of symbols of a second slot period subsequent to the first slot period in time.

In some examples, the second packet mapping component 1120 may map a second portion of the second set of encoded packets onto a third set of resources.

The packet transmitter 1125 may transmit the first subset of the set of encoded packets using the first set of resources and the second subset of the set of encoded packets using the second set of resources.

In some examples, the packet transmitter 1125 may transmit, to the at least one UE of the set of UEs, the second subset of the set of encoded packets based on the negative acknowledgement message.

In some examples, the packet transmitter 1125 may transmit, to the set of UEs, a second set of encoded packets corresponding to a second set of source packets based on determining the absence of feedback information.

In some examples, the packet transmitter 1125 may determine to cease transmission of encoded packets corresponding to the set of encoded packets based on the difference and a number of negative acknowledgement messages received from the set of UEs.

In some examples, the packet transmitter 1125 may transmit, to the set of UEs, a second set of encoded packets corresponding to a second set of source packets based on determining to cease transmission.

In some examples, the packet transmitter 1125 may transmit the first portion of the second set of encoded packets using the one or more resources.

In some examples, the packet transmitter 1125 may transmit the second portion of the second set of encoded packets using the third set of resources.

In some cases, the first and second subsets of the set of encoded packets are transmitted to a first group of user equipments (UEs).

In some cases, the first portion of the second set of encoded packets is transmitted to a second group of UEs different than the first group of UEs, the second group of UEs associated with a higher channel quality than the first group of UEs.

In some cases, the first portion of the second set of encoded packets is transmitted on a frequency band different from the first and second subsets.

In some cases, the one or more resources at least partially overlap in time with the second set of resources.

In some cases, the first portion of the second set of encoded packets is associated with a service different from the multicast service channel.

The threshold manager 1130 may determine a threshold number of encoded packets, where the first subset of the set of encoded packets corresponds to a first number of encoded packets below the threshold number of encoded packets and the second subset of the set of encoded packets corresponds to a second number of encoded packets above the threshold number of encoded packets.

In some examples, the threshold manager 1130 may determine the threshold number of encoded packets based on the channel quality.

In some examples, the threshold manager 1130 may determine a number of UEs capable of decoding the set of encoded packets based on the channel quality, where the threshold number of encoded packets is determined based on the number of UEs capable of decoding the set of encoded packets.

In some examples, the threshold manager 1130 may determine a threshold number of packets associated with the first and second sets of resources.

In some examples, the threshold manager 1130 may determine the third set of resources based on the threshold number of packets.

In some cases, the threshold number of encoded packets is determined based on a capability of a threshold percentage of a set of user equipments (UEs) associated with the multicast service channel to recover the set of source packets from the transmitted first and second subsets.

The channel quality manager 1135 may determine a channel quality of the multicast service channel, the channel quality corresponding to at least one UE supported by the base station.

The feedback scheduler 1140 may schedule at least one feedback channel for a set of user equipments (UEs) associated with the multicast service channel in one or more resources of the second set of resources.

The feedback monitor 1145 may monitor for feedback information from the set of UEs via the one or more resources.

In some examples, the feedback monitor 1145 may receive, from at least one UE of the set of UEs, a negative acknowledgement message associated with the first subset of the set of encoded packets.

In some examples, the feedback monitor 1145 may determine an absence of feedback information from any UE of the set of UEs the set of UEs based on the monitoring.

In some examples, the feedback monitor 1145 may receive, from at least one UE of the set of UEs, an indication of a difference between a number of encoded packets for decoding the set of source packets and a number of the first subset of the set of encoded packets received by the at least one UE.

Figure 12:
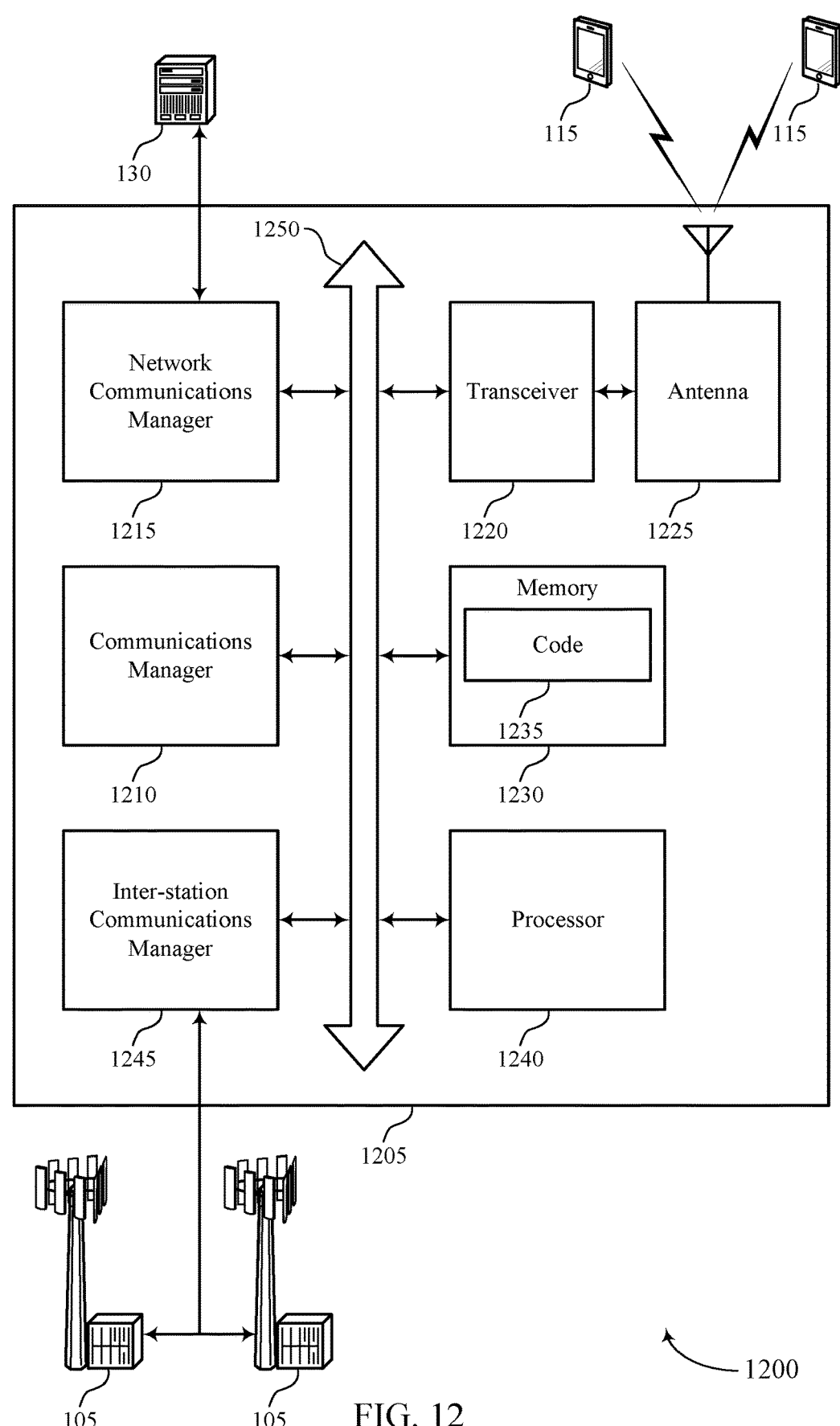
FIG. 12 shows a diagram of a system including a device that supports dynamic coding for wireless systems in accordance with aspects of the present disclosure.

FIG. 12 shows a diagram of a system 1200 including a device 1205 that supports dynamic coding for wireless systems in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a set of encoded packets associated with a multicast service channel, the set of encoded packets corresponding to a set of source packets encoded based on a set of network coding parameters, map a first subset of the set of encoded packets onto a first set of resources of the multicast service channel based on the first set of resources being associated with a first coding rate greater than a threshold coding rate, map a second subset of the set of encoded packets onto a second set of resources of the multicast service channel based on the second set of resources being associated with a second coding rate less than the threshold coding rate, and transmit the first subset of the set of encoded packets using the first set of resources and the second subset of the set of encoded packets using the second set of resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM), read-only memory (ROM), or a combination thereof. The memory 1230 may store computer-readable code 1235 including instructions that, when executed by a processor (e.g., the processor 1240) cause the device to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamic coding for wireless systems).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports dynamic coding for wireless systems in accordance with aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1305, the base station may identify a set of encoded packets associated with a multicast service channel, the set of encoded packets corresponding to a set of source packets encoded based on a set of network coding parameters. The operations of 1305 may be performed according to the methods described herein. In some examples, aspects of the operations of 1305 may be performed by an encoded packet identifier as described with reference to FIGS. 9 through 12.

At 1310, the base station may map a first subset of the set of encoded packets onto a first set of resources of the multicast service channel based on the first set of resources being associated with a first coding rate greater than a threshold coding rate. The operations of 1310 may be performed according to the methods described herein. In some examples, aspects of the operations of 1310 may be performed by a first packet mapping component as described with reference to FIGS. 9 through 12.

At 1315, the base station may map a second subset of the set of encoded packets onto a second set of resources of the multicast service channel based on the second set of resources being associated with a second coding rate less than the threshold coding rate. The operations of 1315 may be performed according to the methods described herein. In some examples, aspects of the operations of 1315 may be performed by a second packet mapping component as described with reference to FIGS. 9 through 12.

At 1320, the base station may transmit the first subset of the set of encoded packets using the first set of resources and the second subset of the set of encoded packets using the second set of resources. The operations of 1320 may be performed according to the methods described herein. In some examples, aspects of the operations of 1320 may be performed by a packet transmitter as described with reference to FIGS. 9 through 12.

FIG. 14 shows a flowchart illustrating a method 1400 that supports dynamic coding for wireless systems in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may identify a set of encoded packets associated with a multicast service channel, the set of encoded packets corresponding to a set of source packets encoded based on a set of network coding parameters. The operations of 1405 may be performed according to the methods described herein. In some examples, aspects of the operations of 1405 may be performed by an encoded packet identifier as described with reference to FIGS. 9 through 12.

At 1410, the base station may map a first subset of the set of encoded packets onto a first set of resources of the multicast service channel based on the first set of resources being associated with a first coding rate greater than a threshold coding rate. The operations of 1410 may be performed according to the methods described herein. In some examples, aspects of the operations of 1410 may be performed by a first packet mapping component as described with reference to FIGS. 9 through 12.

At 1415, the base station may map the first subset of the set of encoded packets to a first set of symbols of a first slot period. The operations of 1415 may be performed according to the methods described herein. In some examples, aspects of the operations of 1415 may be performed by a first packet mapping component as described with reference to FIGS. 9 through 12.

At 1420, the base station may map a second subset of the set of encoded packets onto a second set of resources of the multicast service channel based on the second set of resources being associated with a second coding rate less than the threshold coding rate. The operations of 1420 may be performed according to the methods described herein. In some examples, aspects of the operations of 1420 may be performed by a second packet mapping component as described with reference to FIGS. 9 through 12.

At 1425, the base station may map the second subset of the set of encoded packets to a second set of symbols of a second slot period subsequent to the first slot period in time. The operations of 1425 may be performed according to the methods described herein. In some examples, aspects of the operations of 1425 may be performed by a second packet mapping component as described with reference to FIGS. 9 through 12.

At 1430, the base station may transmit the first subset of the set of encoded packets using the first set of resources and the second subset of the set of encoded packets using the second set of resources. The operations of 1430 may be performed according to the methods described herein. In some examples, aspects of the operations of 1430 may be performed by a packet transmitter as described with reference to FIGS. 9 through 12.

FIG. 15 shows a flowchart illustrating a method 1500 that supports dynamic coding for wireless systems in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may identify a set of encoded packets associated with a multicast service channel, the set of encoded packets corresponding to a set of source packets encoded based on a set of network coding parameters. The operations of 1505 may be performed according to the methods described herein. In some examples, aspects of the operations of 1505 may be performed by an encoded packet identifier as described with reference to FIGS. 9 through 12.

At 1510, the base station may map a first subset of the set of encoded packets onto a first set of resources of the multicast service channel based on the first set of resources being associated with a first coding rate greater than a threshold coding rate. The operations of 1510 may be performed according to the methods described herein. In some examples, aspects of the operations of 1510 may be performed by a first packet mapping component as described with reference to FIGS. 9 through 12.

At 1515, the base station may map a second subset of the set of encoded packets onto a second set of resources of the multicast service channel based on the second set of resources being associated with a second coding rate less than the threshold coding rate. The operations of 1515 may be performed according to the methods described herein. In some examples, aspects of the operations of 1515 may be performed by a second packet mapping component as described with reference to FIGS. 9 through 12.

At 1520, the base station may transmit the first subset of the set of encoded packets using the first set of resources and the second subset of the set of encoded packets using the second set of resources. The operations of 1520 may be performed according to the methods described herein. In some examples, aspects of the operations of 1520 may be performed by a packet transmitter as described with reference to FIGS. 9 through 12.

At 1525, the base station may schedule at least one feedback channel for a set of user equipments (UEs) associated with the multicast service channel in one or more resources of the second set of resources. The operations of 1525 may be performed according to the methods described herein. In some examples, aspects of the operations of 1525 may be performed by a feedback scheduler as described with reference to FIGS. 9 through 12.

At 1530, the base station may monitor for feedback information from the set of UEs via the one or more resources. The operations of 1530 may be performed according to the methods described herein. In some examples, aspects of the operations of 1530 may be performed by a feedback monitor as described with reference to FIGS. 9 through 12.

Figure 16:
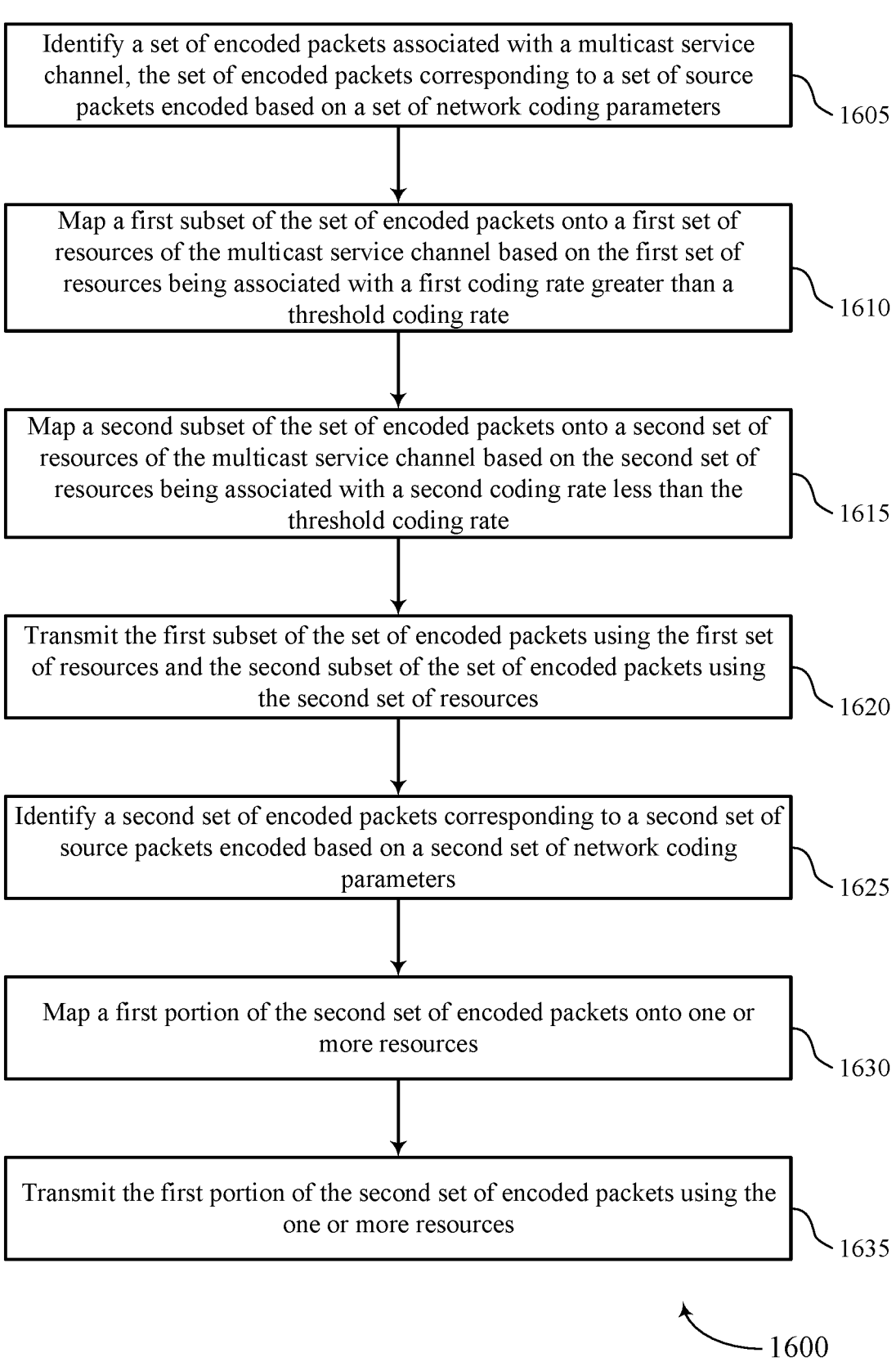

FIG. 16 shows a flowchart illustrating a method 1600 that supports dynamic coding for wireless systems in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a set of encoded packets associated with a multicast service channel, the set of encoded packets corresponding to a set of source packets encoded based on a set of network coding parameters. The operations of 1605 may be performed according to the methods described herein. In some examples, aspects of the operations of 1605 may be performed by an encoded packet identifier as described with reference to FIGS. 9 through 12.

At 1610, the base station may map a first subset of the set of encoded packets onto a first set of resources of the multicast service channel based on the first set of resources being associated with a first coding rate greater than a threshold coding rate. The operations of 1610 may be performed according to the methods described herein. In some examples, aspects of the operations of 1610 may be performed by a first packet mapping component as described with reference to FIGS. 9 through 12.

At 1615, the base station may map a second subset of the set of encoded packets onto a second set of resources of the multicast service channel based on the second set of resources being associated with a second coding rate less than the threshold coding rate. The operations of 1615 may be performed according to the methods described herein. In some examples, aspects of the operations of 1615 may be performed by a second packet mapping component as described with reference to FIGS. 9 through 12.

At 1620, the base station may transmit the first subset of the set of encoded packets using the first set of resources and the second subset of the set of encoded packets using the second set of resources. The operations of 1620 may be performed according to the methods described herein. In some examples, aspects of the operations of 1620 may be performed by a packet transmitter as described with reference to FIGS. 9 through 12.

At 1625, the base station may identify a second set of encoded packets corresponding to a second set of source packets encoded based on a second set of network coding parameters. The operations of 1625 may be performed according to the methods described herein. In some examples, aspects of the operations of 1625 may be performed by an encoded packet identifier as described with reference to FIGS. 9 through 12.

At 1630, the base station may map a first portion of the second set of encoded packets onto one or more resources. The operations of 1630 may be performed according to the methods described herein. In some examples, aspects of the operations of 1630 may be performed by a first packet mapping component as described with reference to FIGS. 9 through 12.

At 1635, the base station may transmit the first portion of the second set of encoded packets using the one or more resources. The operations of 1635 may be performed according to the methods described herein. In some examples, aspects of the operations of 1635 may be performed by a packet transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network entity, comprising:

encoding, based at least in part on a set of network coding parameters and using a rateless code, a set of source packets to obtain a set of encoded packets associated with a multicast service channel;

mapping a first subset of the set of encoded packets onto a first set of resources of the multicast service channel using a first coding rate greater than a threshold coding rate, wherein the mapping is based at least in part on the first set of resources being associated with the first coding rate, the first subset comprising two or more encoded packets of the set of encoded packets, and wherein the first coding rate is associated with a first ratio of a single encoded packet of the first subset to one or more resources of the first set of resources of the multicast service channel;

mapping a second subset of the set of encoded packets onto a second set of resources of the multicast service channel using a second coding rate less than the threshold coding rate, wherein the mapping is based at least in part on the second set of resources being associated with the second coding rate, and wherein the second coding rate is associated with a second ratio of a single encoded packet of the second subset to one or more resources of the second set of resources of the multicast service channel; and transmitting the first subset of the set of encoded packets using the first set of resources and the second subset of the set of encoded packets using the second set of resources.

2. The method of claim 1, further comprising:

mapping the first subset of the set of encoded packets to a first set of symbols of a first slot period; and mapping the second subset of the set of encoded packets to a second set of symbols of a second slot period subsequent to the first slot period in time.

3. The method of claim 1, further comprising:

determining a threshold number of encoded packets, wherein the first subset of the set of encoded packets corresponds to a first number of encoded packets below the threshold number of encoded packets and the second subset of the set of encoded packets corresponds to a second number of encoded packets above the threshold number of encoded packets.

4. The method of claim 3, further comprising:

determining a channel quality of the multicast service channel, the channel quality corresponding to at least one user equipment (UE) supported by the network entity; and determining the threshold number of encoded packets based at least in part on the channel quality.

5. The method of claim 4, further comprising:

determining a number of UEs capable of decoding the set of encoded packets based at least in part on the channel quality, wherein the threshold number of encoded packets is determined based at least in part on the number of UEs capable of decoding the set of encoded packets.

6. The method of claim 3, wherein the threshold number of encoded packets is determined based at least in part on a capability of a threshold percentage of a set of user equipments (UEs) associated with the multicast service channel to recover the set of source packets from the transmitted first and second subsets.

7. The method of claim 1, further comprising:

scheduling at least one feedback channel for a set of user equipments (UEs) associated with the multicast service channel in one or more resources of the second set of resources; and monitoring for feedback information from the set of UEs via the one or more resources.

8. The method of claim 7, wherein monitoring for the feedback information comprises:

receiving, from at least one UE of the set of UEs, a negative acknowledgement message associated with the first subset of the set of encoded packets.

9. The method of claim 8, further comprising:

transmitting, to the at least one UE of the set of UEs, the second subset of the set of encoded packets based at least in part on the negative acknowledgement message.

10. The method of claim 7, further comprising:

determining an absence of feedback information from any UE of the set of UEs based at least in part on the monitoring; and transmitting, to the set of UEs, a second set of encoded packets corresponding to a second set of source packets based at least in part on determining the absence of feedback information.

11. The method of claim 7, wherein monitoring for the feedback information comprises:

receiving, from at least one UE of the set of UEs, an indication of a difference between a number of encoded packets for decoding the set of source packets and a number of the first subset of the set of encoded packets received by the at least one UE.

12. The method of claim 11, further comprising:

determining to cease transmission of encoded packets corresponding to the set of encoded packets based at least in part on the difference and a number of negative acknowledgement messages received from the set of UEs; and transmitting, to the set of UEs, a second set of encoded packets corresponding to a second set of source packets based at least in part on determining to cease transmission.

13. The method of claim 1, further comprising:

identifying a second set of encoded packets corresponding to a second set of source packets encoded based at least in part on a second set of network coding parameters;

mapping a first portion of the second set of encoded packets onto one or more resources; and transmitting the first portion of the second set of encoded packets using the one or more resources.

14. The method of claim 13, wherein:

the first and second subsets of the set of encoded packets are transmitted to a first group of user equipments (UEs); and the first portion of the second set of encoded packets is transmitted to a second group of UEs different than the first group of UEs, the second group of UEs associated with a higher channel quality than the first group of UEs.

15. The method of claim 14, wherein:

the first portion of the second set of encoded packets is transmitted on a frequency band different from the first and second subsets; and the one or more resources at least partially overlap in time with the second set of resources.

16. The method of claim 14, wherein the first portion of the second set of encoded packets is associated with a service different from the multicast service channel.

17. The method of claim 13, further comprising:

mapping a second portion of the second set of encoded packets onto a third set of resources; and transmitting the second portion of the second set of encoded packets using the third set of resources.

18. The method of claim 17, further comprising:

determining a threshold number of packets associated with the first and second sets of resources; and determining the third set of resources based at least in part on the threshold number of packets.

19. The method of claim 1, wherein the set of network coding parameters corresponds to a fountain code.

20. An apparatus for wireless communications at a network entity, comprising:

at least one processor; and at least one memory coupled with the at least one processor with instructions stored in the at least one memory, the instructions being executable by the at least one processor to cause the apparatus to:

encoding, based at least in part on a set of network coding parameters and using a rateless code, a set of source packets to obtain a set of encoded packets associated with a multicast service channel;

map a first subset of the set of encoded packets onto a first set of resources of the multicast service channel using a first coding rate greater than a threshold coding rate, wherein the mapping is based at least in part on the first set of resources being associated with the first coding rate, the first subset comprising two or more encoded packets of the set of encoded packets, and wherein the first coding rate is associated with a first ratio of a single encoded packet of the first subset to one or more resources of the first set of resources of the multicast service channel;

map a second subset of the set of encoded packets onto a second set of resources of the multicast service channel using a second coding rate less than the threshold coding rate, wherein the mapping is based at least in part on the second set of resources being associated with the second coding rate, wherein the second coding rate is associated with a second ratio of a single encoded packet of the second subset to one or more resources of the second set of resources of the multicast service channel; and transmit the first subset of the set of encoded packets using the first set of resources and the second subset of the set of encoded packets using the second set of resources.

21. The apparatus of claim 20, wherein the instructions are further executable by the at least one processor to cause the apparatus to:

map the first subset of the set of encoded packets to a first set of symbols of a first slot period; and map the second subset of the set of encoded packets to a second set of symbols of a second slot period subsequent to the first slot period in time.

22. The apparatus of claim 20, wherein the instructions are further executable by the at least one processor to cause the apparatus to:

determine a threshold number of encoded packets, wherein the first subset of the set of encoded packets corresponds to a first number of encoded packets below the threshold number of encoded packets and the second subset of the set of encoded packets corresponds to a second number of encoded packets above the threshold number of encoded packets.

23. The apparatus of claim 22, wherein the instructions are further executable by the at least one processor to cause the apparatus to:

determine a channel quality of the multicast service channel, the channel quality corresponding to at least one user equipment (UE) supported by the network entity; and determine the threshold number of encoded packets based at least in part on the channel quality.

24. The apparatus of claim 23, wherein the instructions are further executable by the at least one processor to cause the apparatus to:

determine a number of UEs capable of decoding the set of encoded packets based at least in part on the channel quality, wherein the threshold number of encoded packets is determined based at least in part on the number of UEs capable of decoding the set of encoded packets.

25. The apparatus of claim 22, wherein the threshold number of encoded packets is determined based at least in part on a capability of a threshold percentage of a set of user equipments (UEs) associated with the multicast service channel to recover the set of source packets from the transmitted first and second subsets.

26. The apparatus of claim 20, wherein the instructions are further executable by the at least one processor to cause the apparatus to:

schedule at least one feedback channel for a set of user equipments (UEs) associated with the multicast service channel in one or more resources of the second set of resources; and monitor for feedback information from the set of UEs via the one or more resources.

27. The apparatus of claim 26, wherein the instructions to monitor for the feedback information are executable by the at least one processor to cause the apparatus to:

receive, from at least one UE of the set of Us, a negative acknowledgement message associated with the first subset of the set of encoded packets.

28. The apparatus of claim 27, wherein the instructions are further executable by the at least one processor to cause the apparatus to:

transmit, to the at least one UE of the set of UEs, the second subset of the set of encoded packets based at least in part on the negative acknowledgement message.

29. The apparatus of claim 26, wherein the instructions are further executable by the at least one processor to cause the apparatus to:

determine an absence of feedback information from any UE of the set of UEs based at least in part on the monitoring; and transmit, to the set of UEs, a second set of encoded packets corresponding to a second set of source packets based at least in part on determining the absence of feedback information.

30. The apparatus of claim 26, wherein the instructions to monitor for the feedback information are executable by the at least one processor to cause the apparatus to:

receive, from at least one UE of the set of UEs, an indication of a difference between a number of encoded packets for decoding the set of source packets and a number of the first subset of the set of encoded packets received by the at least one UE.

31. The apparatus of claim 30, wherein the instructions are further executable by the at least one processor to cause the apparatus to:

determine to cease transmission of encoded packets corresponding to the set of encoded packets based at least in part on the difference and a number of negative acknowledgement messages received from the set of UEs; and transmit, to the set of UEs, a second set of encoded packets corresponding to a second set of source packets based at least in part on determining to cease transmission.

32. The apparatus of claim 20, wherein the instructions are further executable by the at least one processor to cause the apparatus to:

identify a second set of encoded packets corresponding to a second set of source packets encoded based at least in part on a second set of network coding parameters;

map a first portion of the second set of encoded packets onto one or more resources; and transmit the first portion of the second set of encoded packets using the one or more resources.

33. The apparatus of claim 32, wherein:

the first and second subsets of the set of encoded packets are transmitted to a first group of user equipments (UEs); and the first portion of the second set of encoded packets is transmitted to a second group of UEs different than the first group of UEs, the second group of UEs associated with a higher channel quality than the first group of UEs.

34. The apparatus of claim 33, wherein:

the first portion of the second set of encoded packets is transmitted on a frequency band different from the first and second subsets; and the one or more resources at least partially overlap in time with the second set of resources.

35. The apparatus of claim 33, wherein the first portion of the second set of encoded packets is associated with a service different from the multicast service channel.

36. The apparatus of claim 32, wherein the instructions are further executable by the at least one processor to cause the apparatus to:

map a second portion of the second set of encoded packets onto a third set of resources; and transmit the second portion of the second set of encoded packets using the third set of resources.

37. The apparatus of claim 36, wherein the instructions are further executable by the at least one processor to cause the apparatus to:

determine a threshold number of packets associated with the first and second sets of resources; and determine the third set of resources based at least in part on the threshold number of packets.

38. The apparatus of claim 20, wherein the set of network coding parameters corresponds to a fountain code.

39. An apparatus for wireless communications at a network entity, comprising:

means for encoding, based at least in part on a set of network coding parameters and using a rateless code, a set of source packets to obtain a set of encoded packets associated with a multicast service channel;

means for mapping a first subset of the set of encoded packets onto a first set of resources of the multicast service channel using a first coding rate greater than a threshold coding rate, wherein the mapping is based at least in part on the first set of resources being associated with the first coding rate, the first subset comprising two or more encoded packets of the set of encoded packets, and wherein the first coding rate is associated with a first ratio of a single encoded packet of the first subset to one or more resources of the first set of resources of the multicast service channel;

means for mapping a second subset of the set of encoded packets onto a second set of resources of the multicast service channel using a second coding rate less than the threshold coding rate, wherein the mapping is based at least in part on the second set of resources being associated with the second coding rate, and wherein the second coding rate is associated with a second ratio of a single encoded packet of the second subset to one or more resources of the multicast service channel; and means for transmitting the first subset of the set of encoded packets using the first set of resources and the second subset of the set of encoded packets using the second set of resources.

40. A non-transitory computer-readable medium storing code for wireless communications at a network entity, the code comprising instructions executable by at least one processor to:

encode, based at least in part on a set of network coding parameters and using a rateless code, a set of source packets to obtain a set of encoded packets associated with a multicast service channel;

map a first subset of the set of encoded packets onto a first set of resources of the multicast service channel using a first coding rate greater than a threshold coding rate, wherein the mapping is based at least in part on the first set of resources being associated with the first coding rate, the first subset comprising two or more encoded packets of the set of encoded packets, and wherein the first coding rate is associated with a first ratio of a single encoded packet of the first subset to one or more resources of the first set of resources of the multicast service channel;

map a second subset of the set of encoded packets onto a second set of resources of the multicast service channel using a second coding rate less than the threshold coding rate, wherein the mapping is based at least in part on the second set of resources being associated with the second coding rate, and wherein the second coding rate is associated with a second ratio of a single encoded packet of the second subset to one or more resources of the second set of resources of the multicast service channel; and transmit the first subset of the set of encoded packets using the first set of resources and the second subset of the set of encoded packets using the second set of resources.

* * * * *